United States Patent
Soeya

(10) Patent No.: US 8,084,149 B2
(45) Date of Patent: Dec. 27, 2011

(54) THERMALLY ASSISTED MAGNETIC RECORDING MEDIA AND MAGNETIC RECORDING AND REPRODUCING APPARATUS

(75) Inventor: Susumu Soeya, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 878 days.

(21) Appl. No.: 11/493,233

(22) Filed: Jul. 25, 2006

(65) Prior Publication Data

US 2007/0048552 A1    Mar. 1, 2007

(30) Foreign Application Priority Data

Aug. 25, 2005  (JP) .................. 2005-244842

(51) Int. Cl.
  *G11B 5/66*  (2006.01)
(52) U.S. Cl. ......... 428/827; 428/828; 428/829; 360/131
(58) Field of Classification Search .................. None
  See application file for complete search history.

(56) References Cited

U.S. PATENT DOCUMENTS

| | | |
|---|---|---|
| 5,965,285 A | 10/1999 | Mihara et al. |
| 6,754,020 B1 | 6/2004 | Hikosaka et al. |
| 6,830,824 B2 | 12/2004 | Kikitsu et al. |
| 2001/0051287 A1 * | 12/2001 | Kikitsu et al. ......... 428/694 ML |
| 2002/0192506 A1 | 12/2002 | Coffey et al. |
| 2005/0041335 A1 | 2/2005 | Kikitsu et al. |

OTHER PUBLICATIONS

Thiele, Jan-Ulrich et al., "FeRh/FePt Exchange Spring Films for Thermally Assisted Magnetic Recording Media", *Applied Physics Letters*, vol. 82, No. 17, Apr. 28, 2003, pp. 2859-2861.

* cited by examiner

*Primary Examiner* — Kevin Bernatz
(74) *Attorney, Agent, or Firm* — Zilka-Kotab, PC

(57) ABSTRACT

Embodiments of the invention provide a thermally assisted magnetic recording medium, which can overcome resistance against thermal fluctuation at RT and write capability, obtain a drastic temperature variation in coercive force at right below the recording temperature, and be formed at low temperature. In one embodiment, the medium has a layered structure formed of a lower high-KF ferromagnetic (F) layer formed on a substrate, satisfying $T_W<T_C$, an intermediate low-$K_{AF}$ antiferromagnetic (AF) layer satisfying $T_B<T_W$, and an upper ferromagnetic (F) layer for recording and reproducing, satisfying $T_W<T_C$, where $T_W$ is a recording temperature, $T_C$ is a Curie point, $T_N$ is a Neel point, $T_B$ is a blocking temperature, $K_F$ is a ferromagnetic magnetocrystalline anisotropy constant, and $K_{AF}$ is an antiferromagnetic magnetocrystalline anisotropy constant.

9 Claims, 14 Drawing Sheets

Fig.1

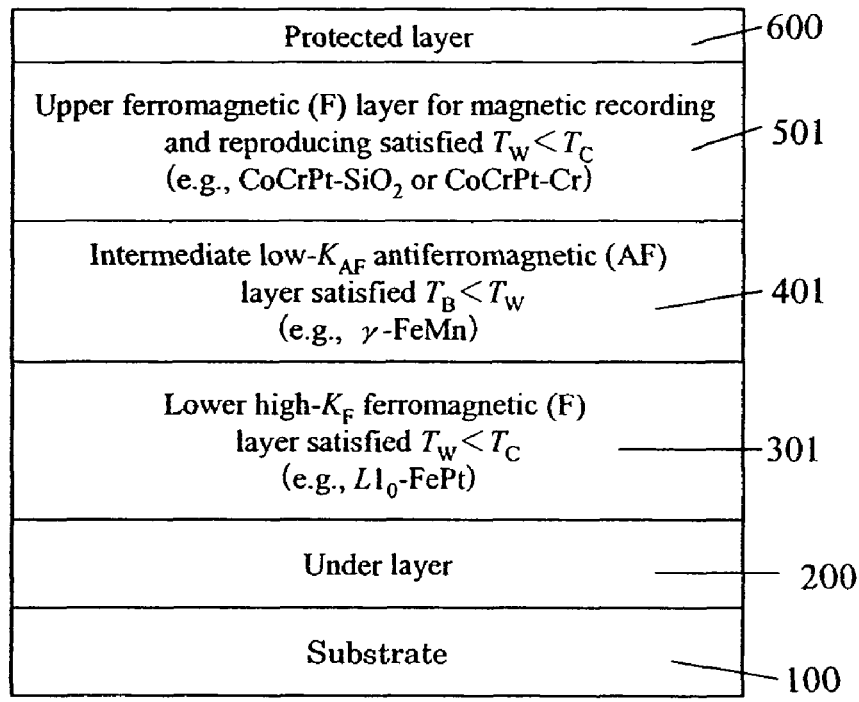

- Protected layer — 600
- Upper ferromagnetic (F) layer for magnetic recording and reproducing satisfied $T_W < T_C$ (e.g., CoCrPt-SiO$_2$ or CoCrPt-Cr) — 501
- Intermediate low-$K_{AF}$ antiferromagnetic (AF) layer satisfied $T_B < T_W$ (e.g., $\gamma$-FeMn) — 401
- Lower high-$K_F$ ferromagnetic (F) layer satisfied $T_W < T_C$ (e.g., $L1_0$-FePt) — 301
- Under layer — 200
- Substrate — 100

Fig.2

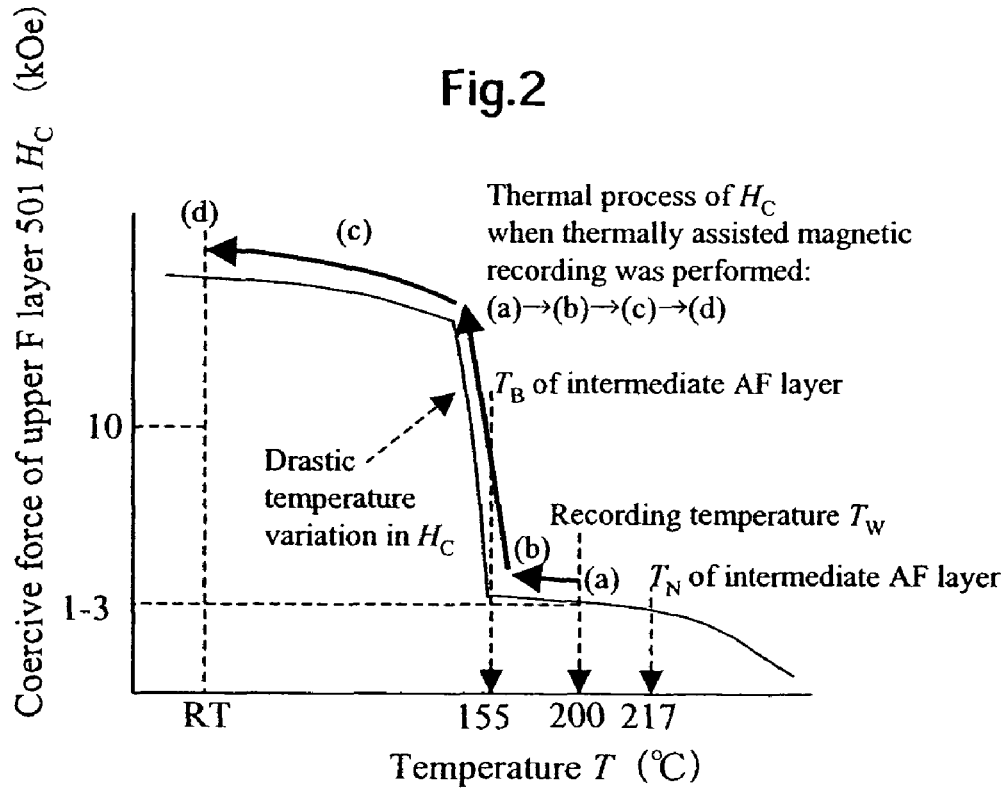

Coercive force of upper F layer 501 $H_C$ (kOe)

Thermal process of $H_C$ when thermally assisted magnetic recording was performed:
(a)→(b)→(c)→(d)

$T_B$ of intermediate AF layer

Drastic temperature variation in $H_C$

Recording temperature $T_W$ $T_N$ of intermediate AF layer

RT  155  200  217

Temperature $T$ (°C)

Fig.13

| Reversed temperature relationship | Problems |
|---|---|
| • In case of upper F layer 501 or 502's $T_C$ satisfying $T_W > T_C$ | • We cannot magnetically record because upper F layer is in paramagnetic state. |
| • In case of intermediate AF layer 401's $T_B$ satisfying $T_B > T_W$ | • We cannot magnetically record because $H_C$ of upper F layer 501 or 502 is tremendously enhanced by (F or AF)/AF/F exchange coupling. |
| • In case of lower F layer 301's $T_C$ satisfying $T_W > T_C (>RT)$, or, lower AF layer 302's $T_N$ satisfying $T_W > T_N (>RT)$ | • Due to "Temperature at which $H_C$ drastically varies" $< < T_W$, we lose the merit of providing drastic temperature variation in $H_C$. That is, we cannot avoid the problem such as cross erasing.<br>• We cannot magnetically record with uniform uniaxial anisotropy.<br>• We cannot obtain drastic temperature variation in $H_C$.<br>• Few $H_C$ enhancement can be obtained by exchange coupling. |
| • In case of lower F layer 301's $T_C$ satisfying $T_W (>RT) > T_C$, or, lower AF layer 302's $T_N$ satisfying $T_W (>RT) > T_N$ | • Exchange coupling between upper F layer 501 or 502 and lower F layer 301 or lower AF layer 302 is produced less than RT. So, temperature variation in $H_C$ of upper F layer for magnetic recording and reproducing 501 or 502 is all the same as that of single-layered F layer 501 or 502, resulting in exchange coupling being meaningless. |

Fig.14

| Upper F layer for magnetic recording and reproducing 501 or 502 | Magnetocrystalline anisotropy energy constant $K_F$ (erg/cm$^2$) | Coercive force $H_C$ (kOe) | Curie point $T_C$ (°C) | $(K_F V_F)/k_B T$<br>$V_F$: Volume of F grain<br>$k_B$: Boltzmann constant<br>(Roughly estimated values when grain diameter, film thickness, and film structure are 100 Å, 100 Å, and columnar structure) |
|---|---|---|---|---|
| CoCrPt-SiO$_2$ | ~4×10$^6$ | ~5-6<br>[~2-3<br>(200°C)] | ~600 | ~3.14×10$^{-12}$/$k_B T$<br>≒77 |
| CoCrPt-Cr | ~2×10$^6$ | ~2-3<br>[~1-1.5<br>(200°C)] | ~427 | ~1.57×10$^{-12}$/$k_B T$<br>≒38 |
| TbFeCo<br>$T_{comp.} \leq 0$°C | ~3-4×10$^5$ | ~8<br>[~1<br>(200°C)] | ~270 | ~2.36-3.14×10$^{-13}$/$k_B T$<br>≒5.8-7.7 |

*When $T_W$ = 200 °C, the above-described upper F layer 501 or 502 satisfies $T_W < T_C$.

Fig.15

| Intermediate AF layer 401 | Magnetocrystalline anisotropy energy constant $K_{AF}$ (erg/cm²) | Blocking temperature $T_B$ (°C) | Neel point $T_N$ (°C) |
|---|---|---|---|
| γ-FeMn | ~$10^5$ | ~155 | 217 |
| γ-MnIr | ~$10^4-10^5$ | ~150−200 | ~327−407 |
| γ-MnRh | ~$10^4-10^5$ | ~150−200 | ~257−347 |
| γ-MnRu | ~$10^4-10^5$ | ~200 | ~527 |
| γ-MnNi | ~$10^4-10^5$ | ~100−150 | ~157−207 |
| γ-MnPt | ~$10^4-10^5$ | ~100 | >150 |
| γ-MnPd | ~$10^4-10^5$ | ~100 | ~157 |
| γ-Mn(PtRh) | ~$10^4-10^5$ | ~150 | ~177 |
| γ-Mn(RuRh) | ~$10^4-10^5$ | ~200 | >250 |

*When $T_W \doteq 200$ °C, the above-described intermediate AF layer 401 satisfies $T_B < T_W$, and or roughly satisfies $T_B < T_W$.

Fig.16

| Lower F layer 301 or lower AF layer 302 | Magnetocrystalline anisotropy energy constant $K_F$ or $K_{AF}$ (erg/cm$^2$) | Curie point $T_C$ (℃) | Neel point $T_N$ (℃) | $(K_F V_F)/k_B T$ or $(K_{AF} V_{AF})/k_B T$<br>$V_F$: Volume of F grain<br>$V_{AF}$: Volume of AF grain<br>$k_B$: Boltzmann constant<br>(Roughly estimated values when grain diameter, film thickness, and film structure are 100 Å, 100 Å, and columnar structure) |
|---|---|---|---|---|
| $L1_0$-FePt | $\sim 7 \times 10^7$ | $\sim 470$ | | $\sim 5.50 \times 10^{-11}/k_B T$<br>$\fallingdotseq 1340$ |
| $L1_0$-CoPt | $\sim 2.8 \times 10^7$ | $\sim 540$ | | $\sim 2.20 \times 10^{-11}/k_B T$<br>$\fallingdotseq 536$ |
| $L1_0$-FePtNi$_{20}$ | $\sim 4 \times 10^7$ | $\sim 302$ | | $\sim 3.14 \times 10^{-11}/k_B T$<br>$\fallingdotseq 765$ |
| $L1_0$-PtMn | $< \sim 10^7$ | | $\sim 700$ | $< \sim 7.86 \times 10^{-12}/k_B T$<br>$\fallingdotseq 191$ |
| $L1_0$-(PtPd)Mn | $< \sim 10^7$ | | $\sim 540 - 700$ | $< \sim 7.86 \times 10^{-12}/k_B T$<br>$\fallingdotseq 191$ |
| $L1_0$-NiMn | $< \sim 10^6$ | | $\sim 867$ | $< \sim 7.86 \times 10^{-13}/k_B T$<br>$\fallingdotseq 19.1$ |
| Ordered Mn$_3$Ir | $< \sim 2 \times 10^6$ | | $\sim 550$ | $< \sim 1.57 \times 10^{-12}/k_B T$<br>$\fallingdotseq 38.2$ |

*When $T_W = 200$ ℃, the above-described lower F layer 301 or lower AF layer 302 satisfies $T_W < T_C$ or $T_W < T_N$.

Fig.17

| Lower F layer 301 or lower AF layer 302 | Upper F layer for magnetic recording & reproducing 501 or 502 | $(KV)_{eff}/k_B T$ values of upper F layer for magnetic recording & reproducing 501 or 502 enhanced by exchange coupling<br><br>(Roughly estimated values when the respective layer's grain diameter, film thickness, and film structure within exchange coupled tri-layered films are 100 Å, 100 Å, and columnar structure) | $H_C$ values of upper F layer for magnetic recording & reproducing 501 or 502 enhanced by exchange coupling<br><br>(Roughly estimated values using a weighted average method when the respective layer's grain diameter, film thickness, and film structure within exchange coupled tri-layered films are 100 Å, 100 Å, and columnar structure) |
|---|---|---|---|
| $L1_0$-FePt | CoCrPt-SiO$_2$<br>CoCrPt-Cr<br>TbFeCo | 1417<br>1378<br>1347 | 46 – 56<br>36 – 54<br>704 – 937 |
| $L1_0$-CoPt | CoCrPt-SiO$_2$<br>CoCrPt-Cr<br>TbFeCo | 613<br>574<br>543 | 20 – 24<br>15 – 23<br>284 – 377 |
| $L1_0$-FePtNi$_{20}$ | CoCrPt-SiO$_2$<br>CoCrPt-Cr<br>TbFeCo | 842<br>803<br>772 | 28 – 33<br>21 – 32<br>404 – 537 |
| $L1_0$-PtMn | CoCrPt-SiO$_2$<br>CoCrPt-Cr<br>TbFeCo | < 268<br>< 229<br>< 198 | < 11<br>< 10<br>< 137 |
| $L1_0$-(PtPd)Mn | CoCrPt-SiO$_2$<br>CoCrPt-Cr<br>TbFeCo | < 268<br>< 229<br>< 198 | < 11<br>< 10<br>< 137 |
| $L1_0$-NiMn | CoCrPt-SiO$_2$<br>CoCrPt-Cr<br>TbFeCo | < 96<br>< 57<br>< 27 | < 4 (×)<br>< 23 (×)<br>< 17 |
| Ordered Mn$_3$Ir | CoCrPt-SiO$_2$<br>CoCrPt-Cr<br>TbFeCo | < 115<br>< 76<br>< 46 | < 5 (×)<br>< 3 (×)<br>< 31 |

*The combinations of lower AF layer 302 and upper F layer 501 shown with symbols of "×" have no effects, because $H_C$ values were less than the maximum applied field 10 kOe of magnetic head.

THERMALLY ASSISTED MAGNETIC RECORDING MEDIA AND MAGNETIC RECORDING AND REPRODUCING APPARATUS

CROSS-REFERENCES TO RELATED APPLICATIONS

This application claims priority from Japanese Patent Application No. JP2005-244842, filed Aug. 25, 2005, the entire disclosure of which is incorporated herein by reference.

BACKGROUND OF THE INVENTION

The present invention relates to thermally assisted magnetic recording media and a magnetic recoding and reproducing apparatus (HDD) using the same.

With the improvement in processing speed of a computer in recent years, high speed and high densification are demanded of the magnetic recording and reproducing apparatus (such as, HDD) which records and reproduces information and data. However, there is a physical limitation in the densification of CoCrPt group media currently being used.

In the case of HDD apparatus, the magnetic recording medium by which information is recorded has a magnetic layer containing the aggregate of fine magnetic particles. In order to perform high density record, it is necessary to make a magnetic domain recorded on the magnetic layer small. To be able to classify a small record magnetic domain, it is required to make the boundary of a magnetic domain smooth, and to micrify the magnetic particle contained in the magnetic layer. Moreover, the boundary of a magnetic domain is shaken if a magnetization reversal carries out in a chain to adjoining magnetic particles. Thus, the magnetic particles need to be magnetically segmentalized by a non-magnetic material (this is commonly called the 'gain segregation' technique). Moreover, from a viewpoint of the magnetic interaction between head media, for recording high density, it is also necessary to make the thickness of a magnetic layer small.

Therefore, for high-density recording, the volume of the magnetization reversal unit (almost equal to a magnetic particle) in a magnetic layer needs to be made even smaller. However, when the magnetization reversal unit is micrified, its anisotropy energy [magnetocrystalline anisotropy energy constant $(K_F) \times$ volume of a magnetic particle $V_F$, $K_F V_F$, (F is an abbreviation of Ferromagnetism)] becomes smaller than the thermal fluctuation energy [Boltzmann constant $(K_B) \times$ temperature (T)] so that the magnetic domain cannot be maintained. This phenomenon is called thermal fluctuation, which is the main factor of the physical limitation (also called a heat fluctuation limitation) of recording density.

To prevent the magnetization reversal due to thermal fluctuation, the magnetocrystalline anisotropy energy constant $K_F$ may be increased. However, in case of the HDD medium, the coercive force $H_C$ during the magnetization reversal operation at high speed is almost proportional to $K_F$, and recording cannot be done at a magnetic field (maximum 10 kOe) where recording head may be generated. Alternatively, $V_F$ may be increased to prevent the magnetization reversal due to thermal fluctuation. However, if $V_F$ is increased by increasing the size of magnetic particles on the medium surface, high-density recording cannot be attained. Meanwhile, if $V_F$ is increased by increasing the thickness of a recording layer, the head magnetic field does not reach sufficiently to the bottom of the recording layer and as a result, the magnetization reversal does not generate, making high-density recording impossible.

In order to solve the above problem, an idea called heat assistant magnetic recording is proposed. This performs magnetic recording by heating a recording layer made of a material of large $K_F$ and locally reducing $K_F$ (i.e., $H_C$). By this method, even if $K_F$ of the recording layer is large under the operating environment of a medium (usually room temperature (RT)), the magnetization reversal becomes possible in the record field generated with the present head.

However, since an adjoining track is somewhat heated at the time of record, the phenomenon (cross erase) in which thermal fluctuation is accelerated by adjoining track and a record magnetic domain is eliminated may happen. Moreover, since the medium is still warm to some extent even when a head magnetic field is lost immediately after recording, the thermal fluctuation is accelerated and a magnetic domain already formed may still disappear. To resolve these problems, it is necessary to use ingredients featuring a high sensitivity to the change in the temperature of $K_F$ (i.e., $H_C$) around the recording temperature. However, since temperature change of $K_F$ (i.e., $H_C$) of the current CoCrPt group medium is almost linear in general, the above-mentioned conditions cannot be fulfilled.

As an attempt to solve the foregoing problem, Japanese Patent Application Laid-Open Pub. No. 2002-358616 disclosed a medium structure consisting of "Functional layer (under layer)/Switching layer (intermediate layer)/Recording layer (upper layer)." According to the disclosure, the functional layer contains a ferrimagnetic (F) layer (since ferrimagnetic substance belongs to ferromagnetic substance), the ferrimagnetic substance is also abbreviated as (F) formed of amorphous rare earth (RE.)-transition metal (TM.) alloy such as TbFe, the recording layer is formed of a ferromagnetic (F) layer of the current CoCrPt group, and the switching layer is formed of a ferrimagnetic (F) layer of RE.-TM. alloy, in which the F layer has a Curie point $(T_C)$ just below the recording temperature $(T_W)$. In this medium with the "Functional layer/Switching layer/Recording layer" structure, "F/F/F" exchange interaction is formed at RT. Owing to this, the $K_F$ (i.e., $H_C$) value at RT can be increased to a large value, which in turn makes it possible to enhance resistance against thermal fluctuation. As mentioned before, since the exchange coupling of "F/F/F" disappears at $T_C$ of the intermediate layer, and becomes magnetic state of "F/Para./F" (Para. is the abbreviation of paramagnetism), the $K_F$ (i.e., $H_C$) value of the recording layer is rapidly lowered to the value of a single recording layer at the temperature of $T_C$ of the intermediate layer. Accordingly, a rapid temperature variation of $K_F$ (i.e., $H_C$) is obtained around the temperature $T_C$ of the intermediate layer (the change of the temperature of $K_F$ (i.e., $H_C$), $dK_F/dT$ or $dH_C/dT$ toward the temperature T is defined as "temperature gradient of $K_F$" or "temperature gradient of $H_C$", and these expressions will also be used throughout the specification). Since the $K_F$ (i.e., $H_C$) value is rapidly lowered to the value of a single recording layer at the temperature $T_W$, write operation can be carried out on the recording layer under a small recording magnetic field.

Moreover, Appl. Phys. Lett., Vol. 82, pp. 2859-2861(2003) disclosed a magnetic film composed of "FeRh (under layer)/FePt (upper layer)." FeRh group material is the only one that goes through phase transition from antiferromagnetism (AF) to ferromagnetism (F) around 100° C. According to this article, at RT, $H_C$ of FePt can be enhanced by the exchange coupling of "AF/F." Also, as the phase is transited from AF→F, the exchange coupling of "AF/F" disappears, and the exchange coupling of "F/F" is generated instead. Since F in the under layer FeRh has a soft magnetic property, a drastic temperature variation in $H_C$ is obtained around AF→F phase transition temperature (about 100° C.) of FeRh.

BRIEF SUMMARY OF THE INVENTION

To realize an HDD exceeding surface recording density terabit/in², a thermally assisted magnetic recording medium without the thermal fluctuation limitation is needed. To realize a thermally assisted magnetic recording medium supporting very high density recording, it is necessary to develop a medium that features resistance against thermal fluctuation at RT and write capability at high temperature, and that is capable of making a drastic temperature variation in $H_C$ at right below $T_W$. At the same time, the medium should be formed at low temperature. Unfortunately, however, there is no such medium meeting all these requirements.

The above-described Japanese Patent Application Laid-Open Pub. No. 2002-358616 provided a means for resulting in a drastic temperature variation in $H_C$ at right below $T_W$ by using $T_C$ of the intermediate layer. Although this method is useful for overcoming the resistance against thermal fluctuation and write capability at RT, the temperature gradient of $H_C$ at right below $T_W$ is hardly steep for the following reasons.

$S_F$ in the intermediate layer at $T_c$ of the intermediate layer severely fluctuates against heat, and $<S_F>$ disappears and therefore F spin arrangement having $J_F<S_F><S_F>$ also disappears (S: Spin, <>: heat average, J: exchange integration). Therefore, the temperature dependency of $K_F$ (i.e., $H_C$) of the recording layer in the exchange coupling film of "F/F/F" of the "Function layer/Switching layer (intermediate layer)/Recording layer" is heavily influenced by the temperature dependency of $<S_F>$ of the intermediate layer from a much lower temperature than $T_C$ of the intermediate layer (a phenomenon where $<S_F>$ is reduced according to Brillouin function with increasing temperature, and $d<S_F>/dT$ increases as it becomes close to $T_C$), so that the temperature gradient of $H_C$ is inevitably dropped. Hence, the above-described problems, such as, bad influence on an adjacent track and cross erasing, cannot be solved.

On the other hand, as described in Appl. Phys. Lett., Vol. 82, pp. 2859-2861(2003), a large $<S_F>$ exists in the FeRh film at a right above the AF→F phase transition temperature in a magnetic film composed of "FeRh/FePt", and an F spin arrangement having a large $J_F<S_F><S_F>$. In consequence, it becomes possible to create a drastic temperature variation in $H_C$, and avoid the problems like the bad influence on an adjacent track or cross erasing. However, since FeRh is an ordered alloy and heat treatment temperature as high as 550° C. is required for transformation (disorder→order phase transition), it is not proper to be put to practical use.

It is, therefore, a feature of the present invention to provide a thermally assisted magnetic recording medium, which is able to (1) overcome the resistance against thermal fluctuation at RT and write capability at high temperature; (2) obtain a drastic temperature variation in $H_C$ at right below $T_W$; and (3) be formed at low temperature.

One aspect of the present invention is directed to a thermally assisted magnetic recording medium, which has a layered film structure formed of an under layer made of high $K_F$ ferromagnetic substance satisfying $T_W<T_C$ or high $K_{AF}$ antiferromagnetic substance satisfying $T_W<T_N$, an intermediate low $K_{AF}$ antiferromagnetic layer satisfying $T_B<T_W$, and an upper layer used as a recording and reproducing layer made of ferromagnetic substance or ferrimagnetic substance satisfying $T_W<T_C$, where $T_W$ is a recording temperature, $T_C$ is a Curie point, $T_N$ is a Neel point, $T_B$ is a blocking temperature, $K_F$ is a ferromagnetic magnetocrystalline anisotropy constant, and $K_{AF}$ is an antiferromagnetic magnetocrystalline anisotropy constant, and which can obtain a drastic temperature variation in $H_C$, i.e., the change in temperature of $H_C$ of the recording and reproducing layer by using a property that $T_B$ of the intermediate low $K_{AF}$ antiferromagnetic layer satisfies $T_B<<T_N$.

By utilizing a magnetic recording medium of the present invention, it becomes possible to provide a thermally assisted magnetic recording medium, which is able to (1) overcome the resistance against thermal fluctuation at RT and write capability at high temperature; (2) obtain a drastic temperature variation in $H_C$ at right below $T_W$; and (3) be formed at low temperature. In this manner, the recording density limitation (thermal fluctuation limitation) that perpendicular magnetic storage media such as current CoCrPt—SiO₂ faces can be overcome. In addition, since the magnetic recording and reproducing layer can maintain a considerably great resistance against thermal fluctuation and high coercive force in a temperature range from RT to blocking temperature (right below the recording temperature), although an adjacent track may be somewhat heated at the time of thermally assisted recording by the temperature increase in base, the adjacent track is not affected adversely and cross erase can be avoided. Hence, a thermally assisted medium with a recording medium exceeding terabit/in² and an HDD apparatus can be provided.

Furthermore, the magnetic recording and reproducing layer requires a Grain segregation technique and formation of a magnetization reversal unit, if CoCrPt—SiO₂ or CoCrPt—Cr film is used as the magnetic recording and reproducing layer, the current (or conventional) technique can be applied. Meanwhile, in case an amorphous TbFeCo group film is used as the magnetic recording and reproducing layer, Grain segregation technique is not required, so there is no need to develop such technique, either.

BRIEF DESCRIPTION OF THE DRAWINGS

FIG. 1 is an enlarged cross sectional view of an exchange coupled tri-layered magnetic medium for thermally assisted magnetic recording formed of a lower ferromagnetic layer/intermediate antiferromagnetic layer/upper ferromagnetic layer for recording and reproducing, according to an embodiment of the present invention.

FIG. 2 illustrates the dependency of the coercive force of the upper ferromagnetic layer in the exchange coupled tri-layered magnetic medium for thermally assisted magnetic recording in FIG. 1 on the temperature.

FIG. 13 lists problems that occur from the reversed temperature relationships among recording temperature, Curie point, Neel point and blocking temperature.

FIG. 14 lists different kinds of ferromagnetic layer for recording and reproducing according to the present invention and their magnetic physical property values.

FIG. 15 lists different kinds of intermediate antiferromagnetic layer according to the present invention and their magnetic physical property values.

FIG. 16 lists different kinds of lower ferromagnetic layer and lower antiferromagnetic layer according to the present invention and their magnetic physical property values.

FIG. 17 describes the combinations of main ingredients, through intermediate antiferromagnetic layer, of exchange coupling between lower ferromagnetic layer or lower antiferromagnetic layer and upper ferromagnetic layer or upper ferrimagnetic layer, resistance values against thermal fluctuation at RT given to the upper ferromagnetic layer or upper ferrimagnetic layer by exchange coupling, and coercive force thereof.

DETAILED DESCRIPTION OF THE INVENTION

Figure 3:
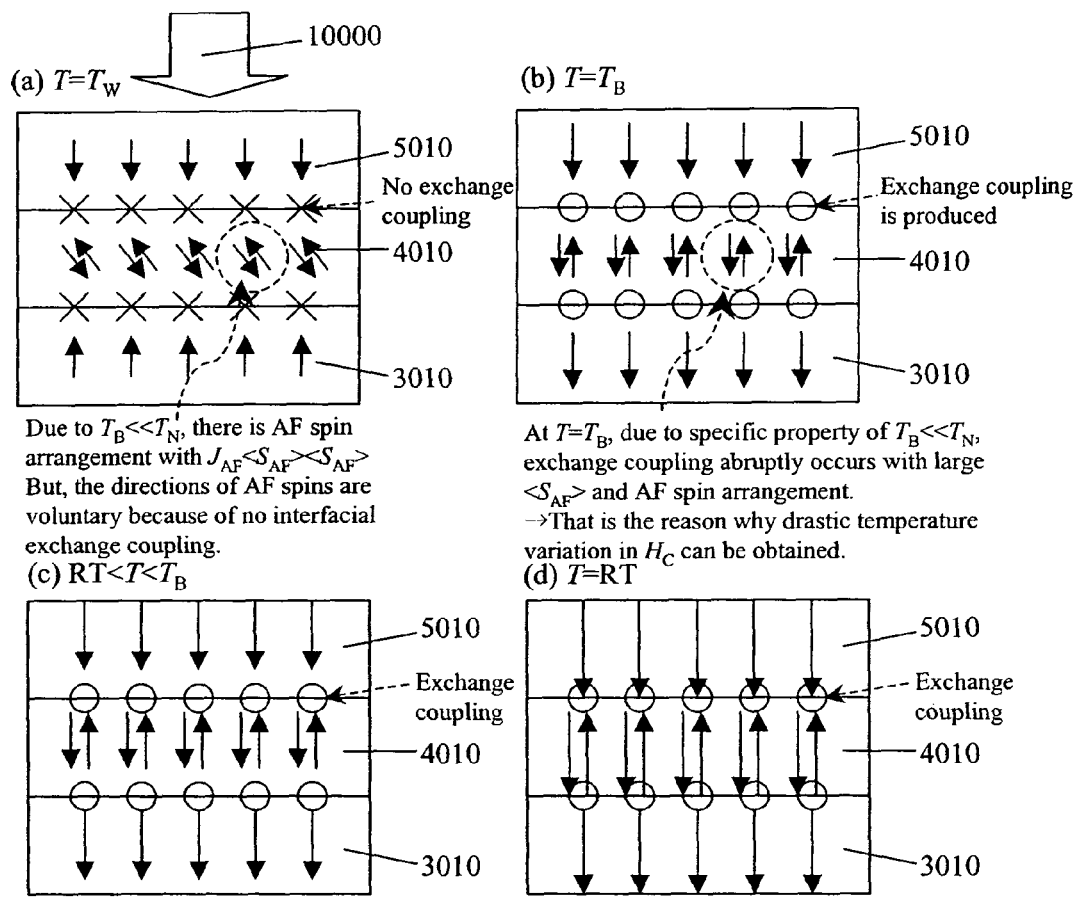
FIG. 3 illustrates a spin arrangement at the time of thermally assisted magnetic recording on the exchange coupled tri-layered magnetic medium for thermally assisted magnetic recording in FIG. 1.

The following will now explain exemplary embodiments of the present invention with reference to accompanying drawings.

Example 1

FIG. 1 illustrates an exchange coupled tri-layered magnetic medium for thermally assisted magnetic recording, according to an embodiment of the present invention. The medium has a layered structure formed of an under layer 200 disposed on a substrate 100, a lower high-KF ferromagnetic (F) layer 301 satisfying $T_W < T_C$, an intermediate low-$K_{AF}$ antiferromagnetic (AF) layer 401 satisfying $T_B < T_W$, an upper ferromagnetic (F) layer 501 for recording and reproducing, satisfying $T_W < T_C$, and a protected layer 600, where $T_W$ is a recording temperature, $T_C$ is a Curie point, $T_N$ is a Neel point, $T_B$ is a blocking temperature, $K_F$ is a ferromagnetic magnetocrystalline anisotropy constant, and $K_{AF}$ is an antiferromagnetic magnetocrystalline anisotropy constant. The substrate 100 is made of glass, the under layer 200 is formed of a Ru film, the lower F layer 301 is formed of $L1_0$-FePt film, the intermediate AF layer 401 is formed of γ-FeMn film, the upper F layer 501 is formed of CoCrPt—SiO$_2$ (or CoCrPt—Cr film), and the protected layer 600 is formed of C film. In the case where the thermally assisted magnetic recording medium is formed at low temperature, the closely packed surface of each layer Ru(001)/L1$_0$-FePt(111)/γ-FeMn(111)/CoCrPt—SiO$_2$(001) (or CoCrPt—Cr(001)) crystalline alignment can be obtained, so perpendicular magnetized film is formed. The typical thickness for each layer is 20 nm for the under layer 200, 10 nm for the lower F layer 301, 10 nm for the intermediate AF layer 401, 10 nm for the upper F layer 501, and 3 nm for the protected layer 600. Here, SiO$_2$ of the CoCrPt—SiO$_2$ and part of Cr in the CoCrPt—Cr film is precipitated from the grain to the grain boundary and takes participate in the Grain segregation and formation of magnetization reversal unit. In the specification hereinafter, "CoCrPt—SiO$_2$ film" and "CoCrPt—Cr film" are used.

FIG. 2 illustrates the dependency of the coercive force ($H_C$) of the upper F layer in the exchange coupled tri-layered magnetic medium for thermally assisted magnetic recording on the temperature (T). Particularly, the graph shows the relation between $H_C$ and T in the case where the lower F layer 301 is formed of 10 nm-thick L1$_0$-FePt film, the intermediate AF layer 401 is made of 10 nm-thick γ-FeMn film, and the upper F layer 501 is made of 10 nm-thick CoCrPt—SiO$_2$ film or CoCrPt—Cr film. Since $K_F \propto H_C$, the temperature dependency of $K_F$ exhibits similar features to the temperature dependency of $H_C$ in FIG. 2. The $H_C$ value of the upper F layer 501 at RT is very large by the "F/AF/F" exchange coupling of the tri-layer "lower F layer 301/intermediate AF layer 401/upper F layer 501." As summarized in FIG. 17, in the case where the upper F layer 501 is formed of CoCrPt—SiO$_2$ film its $H_C$ value is approximately 46-56 kOe, and in the case where the upper F layer 501 is formed of CoCrPt—Cr film its $H_C$ value is approximately 36-54 kOe.

For approximate calculation of $H_C$ value, a weighted average was used. Using the $K_F$ value and $H_C$ value of the upper F layer 501 shown in FIG. 14 and the $K_F$ value of the lower F layer 301 shown in FIG. 16, the $H_C$ value was calculated using the following formula: [($K_F$x$V_F$ of lower F layer 301+$K_F$x$V_F$ of upper F layer 501)/($V_F$ value of lower F layer 301+$V_F$ value of upper F layer 501)]×[1/($K_F$ value of the single upper F layer 501 at RT)×($H_C$ value of the single upper F layer 501 at RT)]. Here, $V_F$ indicates the volume of a crystalline particle of the ferromagnetic substance, and $V_{AF}$ indicates the volume of a crystalline particle of antiferromagnetic substance. As summarized in FIG. 15, since $K_{AF}$ of the intermediate AF layer 401 is small, the product of $K_{AF}V_{AF}$ of the intermediate AF layer 401 was ignored.

FIG. 14 lists different kinds of the upper F layers 501 and 502 for magnetic recording and reproducing and their physical property values, FIG. 15 lists different kinds of the intermediate AF layer 401 and their physical property values, FIG. 16 lists different kinds of the lower F layer 301 and lower AF layer 302 and their physical property values, and FIG. 17 lists the combination of major ingredients of exchange coupling between the lower F layer 301 or the lower AF layer 302 and the upper F layer 501 or 502 (through the intermediate AF layer 401) and effective resistance against thermal fluctuation given to the upper F layers 501 and 502 by the exchange coupling, i.e., $(KV)_{eff}/k_BT$ value (RT) and $H_C$ value (RT) ($(KV)_{eff}$: effective (KV) product, $k_B$: Boltzmann constant). Here, the $(KV)_{eff}/k_BT$ value is obtained based on the assumption that $K_FV_F$ product of the lower F layer 301 or $K_{AF}V_{AF}$ product of the lower AF layer 302 is completely overlapped with the $K_FV_F$ product of the upper F layers 501 and 502 through the intermediate AF layer 401, and one of $H_C$ values is obtained using a weighted average based on the assumption that $K_FV_F$ product of the lower F layer 301 or $K_{AF}V_{AF}$ product of the lower AF layer 302 is completely overlapped with the $K_FV_F$ product of the upper F layers 501 and 502 through the intermediate AF layer 401.

Now that the $H_C$ value of the single CoCrPt—SiO$_2$ layer at RT is approximately 5-6 kOe and the $H_C$ value of the single CoCrPt—Cr layer at RT is approximately 2-3 kOe (FIG. 14), it can be increased to a very high value by the "F/AF/F" exchange coupling, and it actually highly exceeds the maximum magnetic field 10 kOe of a recording head. Moreover, the greatest $H_C$ value of the upper F layer 501 at RT gradually decreases by heating according to the Brillouin function, and rapidly decreases when $T_B$ of the intermediate AF layer 401 is approximately 155° C. and $T_W \approx 200°$ C. (that is, at a temperature where the "F/AF/F" exchange coupling disappears), and afterward is dependent on the $H_C$ vs. temperature of the single upper F layer 501. The $H_C$ value when $T_W \approx 200°$ C. was about 2-3 kOe if the upper F layer 501 is formed of CoCrPt—SiO$_2$ film, and about 1-1.5 kOe if the upper F layer 501 is made of CoCrPt—Cr film. FIG. 2 particularly illustrates that a drastic temperature variation (in step or stair shape) in $H_C$ value was obtained around $T_B$ value or right below $T_W$. The reason why $T_W \approx 200°$ C. was chosen is as follows. If $T_W$ is too high, the medium is deteriorated due to repetitive heat scanning. To the contrary, if $T_W$ is too low, the desirable temperature gradient of $H_C$ cannot be obtained. This is the reason why $T_W \approx 200°$ C. is regarded as ideal.

Moreover, FIG. 17 lists $(KV)_{eff}/k_BT$ values of the upper F layer 501 of the exchange coupled tri-layered magnetic media at RT. Here, $(KV)_{eff}/k_BT$ value was calculated using the formula of $[(K_FV_F$ product of lower F layer 301$)+(K_FV_F$ product of upper F layer 501$)/(k_BT)]$. As listed in FIG. 15, since $K_{AF}$ of the intermediate AF layer 401 is small, the product of $K_{AF}V_{AF}$ of the intermediate AF layer 401 was ignored. $(KV)_{eff}/k_BT$ value of the upper F layer 501 at RT was about 1417 if the upper F layer 501 was made of CoCrPt—SiO$_2$ film, whereas about 1378 if the upper F layer 501 was made of CoCrPt—Cr film. Since the $(KV)_{eff}/k_BT$ value of the single CoCrPt—SiO$_2$ layer at RT is about 77, and $(KV)_{eff}/k_BT$ value of the single CoCrPt—Cr layer is about 38 (FIG. 14), the $(KV)_{eff}/k_BT$ value of the upper F layer 501 at RT can be increased to a very high value by "F/AF/F" exchange coupling. In FIG. 2, $H_C$ value when $T_W \approx 200°$ C. was about 2-3 kOe if the upper F layer 501 is formed of CoCrPt—SiO$_2$ film, and about 1-1.5 kOe if the upper F layer 501 is made of CoCrPt—Cr film. Considering that the maximum recording magnetic field of the current head is about 10 kOe, the $H_C$ value when $T_W \approx 200°$ C. was lowered to about 2-3 kOe (CoCrPt—SiO$_2$ film) or about 1-1.5 kOe (CoCrPt—Cr film), whereby the write (recording) operation on the upper F layer 501 can be done easily. Furthermore, since the under layer 200, the lower F layer 301, the intermediate AF layer 401, the upper F layer 501 and the protected layer 600 can be composed of closed packed crystalline sheets, the formation process may be carried out at RT. Although the heating process is required for obtaining L1$_0$-FePt film composing the lower F layer 301, the heating temperature is equal to or lower than 350° C., which is almost equal to the highest heating temperature of the current medium. Thus, there is no problem to put this example to practical use.

From the above, one can conclude that a very high resistance against thermal fluctuation and a high $H_C$ value are obtained in a temperature range between RT and $T_B$ by tri-layer "F/AF/F" exchange coupling (i.e., "lower F layer 301/intermediate AF layer 401/upper F layer 501"). Also, the write capability at high temperature was overcome, and a drastic temperature variation in $H_C$ value (i.e., the large temperature gradient of $H_C$) was obtained around $T_B$ or at right below $T_W$. In addition, it was confirmed that the medium formation can be carried out at low temperature. In this manner, by using the tri-layer medium formed of "F/AF/F" exchange coupling (i.e., lower F layer 301/intermediate AF layer 401/upper F layer 501) it becomes possible to realize a thermally assisted magnetic recording medium, which can (1) overcome the resistance against thermal fluctuation at RT and write capability at high temperature; (2) obtain a drastic temperature variation in $H_C$ at right below $T_W$; and (3) be formed at low temperature.

The following will now explain the thermally assisted magnetic recording procedure for the exchange coupled tri-layer medium formed of lower F layer 301/intermediate AF layer 401/upper F layer 501. FIG. 3 illustrates a spin arrangement at the time of thermally assisted magnetic recording of an "F/AF/F" exchange coupled crystal grain formed of "one crystal grain 3010 of lower F layer/one crystal grain 4010 of intermediate AF layer/one crystal grain 5010 of upper F layer." Although it shows the shape of one crystal grain, a magnetization reversal unit reveals the same shape. In this case, it is assumed that the lower F layer 301 and the crystal grain 3010 of the lower F layer are formed of L1$_0$-FePt, the intermediate AF layer 401 and the crystal grain 4010 of the intermediate AF layer 401 are formed of γ-FeMn, and the upper F layer 501 and the crystal grain 5010 of the upper F layer are formed of CoCrPt—SiO$_2$ (or CoCrPt—Cr). Moreover, $T_C$ of L1$_0$-FePt is about 470° C. (FIG. 16), Neel point ($T_N$) of γ-FeMn is about 217° C. (FIG. 15), $T_C$ of CoCrPt—SiO$_2$ is about 600° C., and $T_C$ of CoCrPt—Cr is about 427° C. (FIG. 14). Since the ideal $T_W$ is about 200° C., the following description will be based on $T_W \approx 200°$ C.

As shown in FIG. 3(a), suppose that the thermal and recording magnetic field 10000 at $T=T_W$ is irradiated and applied from the upper surface of the medium to downward during the thermally assisted magnetic recording process. Since $T_C$ of L1$_0$-FePt is about 470° C., $T_N$ of γ-FeMn is about 217° C., $T_C$ of CoCrPt—SiO$_2$ is about 600° C. (or $T_C$ of CoCrPt—Cr is about 427° C.), which are all higher than $T_W \approx 200°$ C., the magnetic state in one crystal grain composed of "a crystal grain 3010 of lower F layer/a crystal grain 4010 of intermediate AF layer/a crystal grain 5010 of upper F layer" at $T=T_W$ is "F/AF/F." However, since $T_B$* (see note on blocking temperature below) of γ-FeMn is about 155° C., more accurate magnetic state thereof is "F/Para.(interface)/ AF/Para.(interface)/F" (Para. is an abbreviation of paramagnetism). Therefore, at $T=T_W$, the magnetization vector in one crystal grain 5010 of the upper F layer is easily turned to downward due to the low $H_C$ of CoCrPt—SiO$_2$ (or the low $H_C$ of CoCrPt—Cr). However, because the exchange coupling is not yet formed, the direction of the AF spin arrangement in one crystal grain 4010 of the intermediate AF layer is arbitrary. Similarly, the direction of the F spin arrangement in one crystal grain 3010 of the lower F layer is arbitrary. This is so because the $H_C$ value of the single L1$_0$-FePt layer is very high and disposed at the lowest layer, and is not influenced by the recording magnetic field. But in the drawing the magnetization vector of one crystal grain 3010 of the lower F layer points upward in consideration of the influence of the demagnetizing field.

Note*: Blocking temperature $T_B$ is defined as a temperature where the ferromagnetic/antiferromagnetic exchange coupling disappears. It is determined by antiferromagnetic material and is not much dependent on the ferromagnetic material. It will be worthwhile to stress that most of antiferromagnetic materials have the "$T_B \ll T_N$" property. In case of antiferromagnetic/antiferromagnetic exchange coupling, $T_B$ is determined by the antiferromagnetic material with low $T_N$, and the $T_B$ value is almost equal to the $T_B$ value where the ferromagnetic/antiferromagnetic exchange coupling disappears. Therefore, in the specification, the expression of "$T_B$ of the antiferromagnetic layer or $T_B$ of γ-FeMn" was used.

As shown in FIG. 3(b), when $T=T_B$, exchange coupling occurs. Accordingly, the magnetic state of one crystal grain formed of "one crystal grain 3010 of lower F layer/one crystal grain 4010 of intermediate AF layer/one crystal grain 5010 of upper F layer" is transited from "F/Para.(interface)/AF/Para.(interface)/F" to "F/AF/F." To make the spin in one crystal grain 5010 of the upper F layer face downward, the spin of each layer, each interface is arranged and field-cooled in a frozen state. The internal field generated by the exchange coupling is about several hundred kOe. Due to this magnitude, the AF spin in one crystal grain 4010 of the intermediate AF layer and the F spin in one crystal grain 3010 of the lower F layer are ordered as shown in FIG. 3(b).

Because of the property "$T_B \ll T_N$", at $T=T_B$, one crystal grain 4010 of the intermediate AF layer has a relatively large $<S_{AF}>$, and therefore there is the AF spin arrangement with a relatively large $J_{AF} <S_{AF}><S_{AF}>$ (S: spin, < >: heat average, J: exchange integration). At $T=T_B$, "F/AF/F" exchange coupling abruptly occurs with large $<S_{AF}>$ and $J_{AF} <S_{AF}><S_{AF}>$, so $H_C$ at $T=T_B$ rapidly increases (in step shape). This is the reason why a drastic temperature variation in $H_C$ is obtained at $T=T_B$, and is a physical phenomenon obtained based on the specific property of "$T_B \ll T_N$." That is to say, this is a physical phenomenon that cannot be obtained by using $T_C$ of the intermediate layer disclosed in Japanese Patent Application Laid-Open Pub. No. 2002-358616.

As shown in FIG. 3(c), when RT<T<$T_B$, the magnetization vector of each layer is increased, and keeps increasing when T=RT and stops as shown in FIG. 3(d). So far, the thermally assisted magnetic recording procedure has been explained. The upward recording procedure is only the opposite of the magnetization vector.

Also, the lower F layer 301 of the present invention may be formed of $L1_0$-CoPt film or $L1_0$-FePtNi film. As summarized in FIG. 17, (a) $(KV)_{eff}/k_B T$ value of the upper F layer 501 at RT is about 613 and $H_C$ value thereof is about 20-24 kOe even in the combination where the lower F layer 301 is formed of $L1_0$-CoPt film and the upper F layer 501 is formed of CoCrPt—$SiO_2$ film;

(b) $(KV)_{eff}/k_B T$ value of the upper F layer 501 at RT is about 574 and $H_C$ value thereof is about 15-23 kOe even in the combination where the lower F layer 301 is formed of $L1_0$-CoPt film and the upper F layer 501 is formed of CoCrPt—Cr film;

(c) $(KV)_{eff}/k_B T$ value of the upper F layer 501 at RT is about 842 and $H_C$ value thereof is about 28-33 kOe even in the combination where the lower F layer 301 is formed of $L1_0$-FePtNi film and the upper F layer 501 is formed of CoCrPt—$SiO_2$ film; and (d) $(KV)_{eff}/k_B T$ value of the upper F layer 501 at RT is about 803 and $H_C$ value thereof is about 21-32 kOe even in the combination where the lower F layer 301 is formed of $L1_0$-FePtNi film and the upper F layer 501 is formed of CoCrPt—Cr film. Although the heating process is required for obtaining the $L1_0$-CoPt film or $L1_0$-FePtNi film, since the process may be conducted at 350° C. at most, there is no problem to put it into practical use.

As summarized in FIG. 15, the intermediate AF layer 401 according to this embodiment of the invention may be formed of one of γ-MnIr film, γ-MnRh film, γ-MnNi film, γ-MnRu film, γ-MnPt film, γ-MnPd film, γ-Mn(PtRh) film, and γ-Mn(RuRh) film. Also, to make $T_B$ below 200° C., the Ir composition, Rh composition, Ru composition, Ni composition, Pt composition, Pd composition, (PtRh) composition, and (RuRh) composition are less than 20 at.%, respectively. As shown in FIG. 15, $K_{AF}$ value of the AF layer is the same as that of γ-FeMn film, and $T_B$ value of the AF layer is the same as that of γ-FeMn film, and the AF layer has the property of "$T_B \ll T_N$".

Also, as can be seen in FIG. 15, in case of γ-MnIr film, γMnRh film, and γ-MnRu film, the difference between $T_B$ and $T_N$ is great. Therefore, by using the AF layer thereof, the property of "$T_B \ll T_N$" becomes more effective. Namely, during the thermally assisted magnetic recording procedure, at $T=T_B$, the "F/AF/F" exchange coupling abruptly occurs with larger $<S_{AF}>$ and $J_{AF} <S_{AF}><S_{AF}>$, so it becomes possible to increase the temperature gradient of $H_C$ at $T=T_B$.

Moreover, the length of one side of the closely packed hexagonal lattice in the surface (111) of the γ-MnIr film, γ-MnRh film, and γ-MnRu film is almost equal to the length of one side of the closely packed hexagonal lattice in the surface (111) of the $L1_0$-FePt film, $L1_0$-CoPt, and $L1_0$-FePtNi film composing the lower F layer 301, and to the length of one side of the closely packed hexagonal lattice in the surface (001) of the CoCrPt—$SiO_2$ film (or the surface (001) of the CoCrPt—Cr film) composing the upper F layer 501. Hence, by forming the intermediate AF layer 401 with the γ-MnIr film, γ-MnRh film, and γ-MnRu film, lattice mismatch problems can be avoided. In consequence, it becomes possible to obtain $H_C$ value or $(KV)_{eff}/k_B T$ value close to the theoretical values (i.e., calculation results shown in FIG. 17), and the anisotropy dispersion of the upper F layer 501 can be kept small.

Furthermore, in the case of raising $T_W$ higher than 200° C., it is desirable to use the γ-MnIr film, γ-MnRh film, and γ-MnRu film having more than 20 at.% of Ir composition, Rh composition and Ru composition, respectively, as the intermediate AF layer 401. The resulting AF layer thereof has about 240-300° C. $T_B$ value, and it becomes possible to adjust the $T_B$ value to a desired value, i.e., right below the $T_W$, by the Ir composition, Rh composition, and Ru composition.

However, the γ-MnIr film, γ-MnRh film, and γ-MnRu film increase the cost. Thus, when using the AF layer made of such films, trade-off is necessary between the magnetic physical property value and the cost problem.

So far, the magnetic recording with perpendicular anisotropy in the exchange coupled tri-layered magnetic medium has been explained. However, the development is also possible for magnetic recording with in-plane anisotropy and magnetic recording with inclined anisotropy.

Example 2

Figure 4:
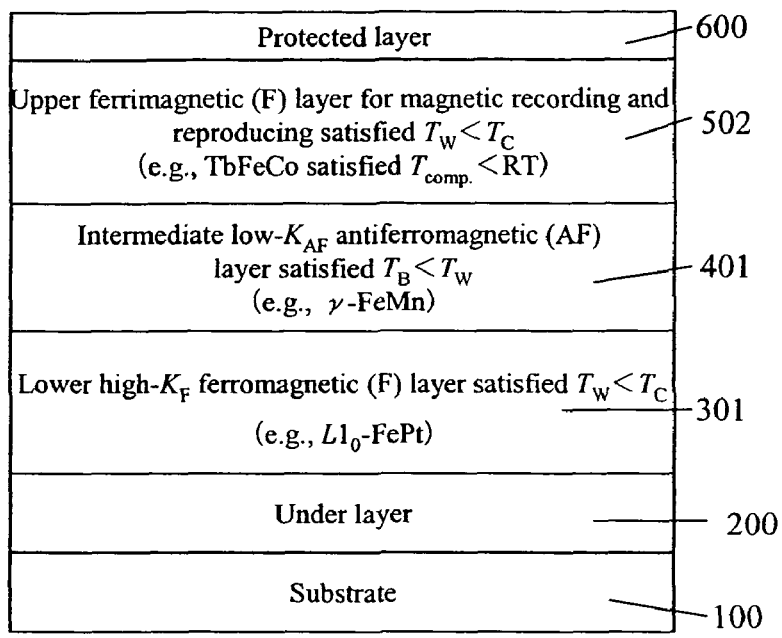
FIG. 4 is an enlarged cross sectional view of an exchange coupled tri-layered magnetic medium for thermally assisted magnetic recording formed of a lower ferromagnetic layer/intermediate antiferromagnetic layer/upper ferrimagnetic layer for recording and reproducing, according to another embodiment of the present invention.

FIG. 4 illustrates an exchange coupled tri-layered magnetic medium for thermally assisted magnetic recording, according to another embodiment of the present invention. The medium has a layered structure formed of an under layer 200 disposed on a substrate 100, a lower high-KF ferromagnetic (F) layer 301 satisfying $T_W<T_C$, an intermediate low-$K_{AF}$ antiferromagnetic (AF) layer 401 satisfying $T_B<T_W$, an upper ferrimagnetic (F) layer 502 for recording and reproducing, satisfying $T_W<T_C$, and a protected layer 600. The substrate 100 is made of glass, the under layer 200 is formed of a Ru film, the lower F layer 301 is formed of $L1_0$-FePt film, the intermediate AF layer 401 is formed of γ-FeMn film, the upper F layer 502 is formed of amorphous TbFeCo film having magnetization compensation point $T_{Comp.}\leq 0°$ C., and the protected layer 600 is formed of C film. In the case where the thermally assisted magnetic recording medium is formed at low temperature, the closely packed surface of each layer Ru(001)/$L1_0$-FePt(111)/γ-FeMn(111)/amorphous TbFeCo crystalline alignment can be obtained, so that a perpendicular magnetized film is formed. The typical thickness for each layer is 20 nm for the under layer 200, 10 nm for the lower F layer 301, 10 nm for the intermediate AF layer 401, 10 nm for the upper F layer 502, and 3 nm for the protected layer 600.

Figure 5:
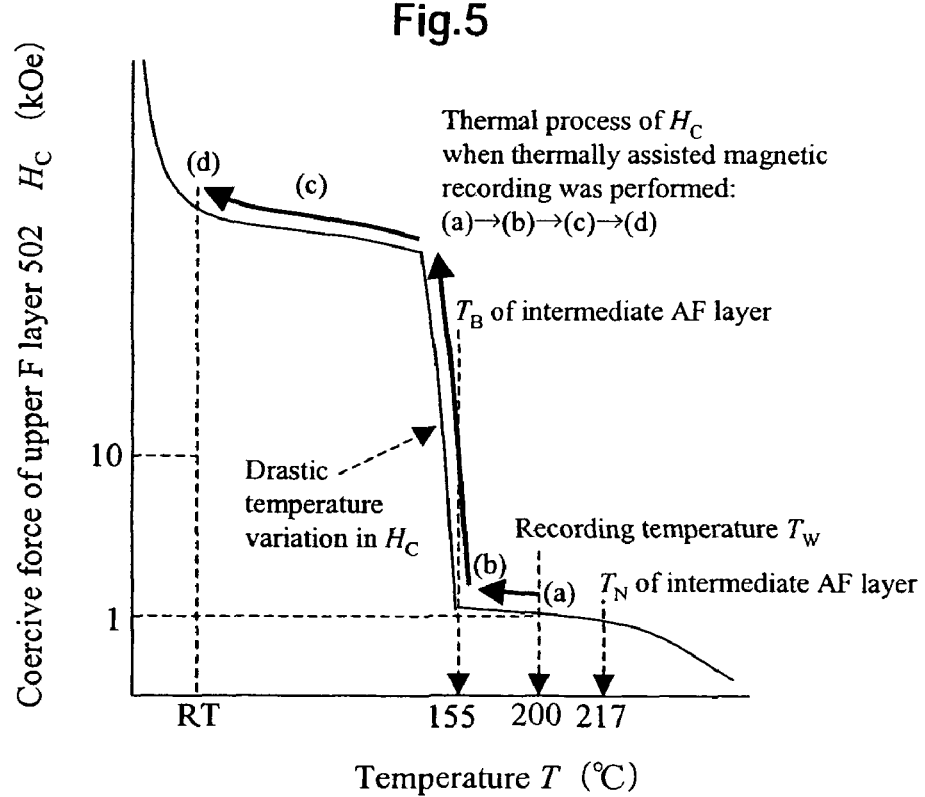
FIG. 5 illustrates the dependency of the coercive force of the upper ferrimagnetic layer in the exchange coupled tri-layered magnetic medium for thermally assisted magnetic recording in FIG. 4 on the temperature.

FIG. 5 illustrates the dependency of the coercive force ($H_C$) of the upper F layer in the exchange coupled tri-layered magnetic medium for thermally assisted magnetic recording on the temperature (T). Particularly, the graph shows the relation between $H_C$ and T in the case where the lower F layer 301 is formed of 10 nm-thick $L1_0$-FePt film, the intermediate AF layer 401 is made of 10 nm-thick γ-FeMn film, and the upper F layer 502 is made of 10 nm-thick TbFeCo film. The $H_C$ value of the upper F layer 502 at RT is very large by the "F/AF/F" exchange coupling of the tri-layer "lower F layer 301/intermediate AF layer 401/upper F layer 502." As summarized in FIG. 17, in the case where the upper F layer 502 is formed of TbFeCo film its $H_C$ value is approximately 704-937 kOe.

For approximate calculation of $H_C$ value, a weighted average was used. Using the $K_F$ value and $H_C$ value of the upper F layer 502 shown in FIG. 14 and the $K_F$ value of the lower F layer 301 shown in FIG. 16, the $H_C$ value was calculated using the following formula: $[(K_F\times V_F$ of lower F layer $301+K_F\times V_F$ of upper F layer $502)/(V_F$ value of lower F layer $301+V_F$ value of upper F layer $502)]\times[1/(K_F$ value of the single upper F layer 502 at RT)$\times$($H_C$ value of the single upper F layer 502 at RT)]. As summarized in FIG. 15, since $K_{AF}$ of the intermediate AF layer 401 is small, the product of $K_{AF}V_{AF}$ of the intermediate AF layer 401 was ignored.

Now that the $H_C$ value of the single TbFeCo layer at RT is approximately 8 kOe (FIG. 14), it can be increased to a very high value by the "F/AF/F" exchange coupling, and it actually highly exceeds the maximum magnetic field 10 kOe of a recording head. Moreover, the greatest $H_C$ value of the upper F layer 502 at RT gradually decreases by heating according to the Brillouin function, and rapidly decreases when $T_B$ of the intermediate AF layer 401 is approximately 155° C. and $T_W\approx 200°$ C. (that is, at a temperature where the "F/AF/F" exchange coupling disappears), and afterward is dependent on the $H_C$ vs. temperature of the single upper F layer 502. The $H_C$ value when $T_W\approx 200°$ C. was about 1 kOe if the upper F layer 502 is formed of TbFeCo film. FIG. 5 particularly illustrates that a drastic temperature variation (in step or stair shape) in $H_C$ value was obtained around $T_B$ value or right below $T_W$.

Moreover, FIG. 17 lists $(KV)_{eff}/k_BT$ values of the upper F layer 502 of the exchange coupled tri-layered magnetic media at RT. Here, $(KV)_{eff}/k_BT$ value was calculated using the formula of $[(K_FV_F$ product of lower F layer $301)+(K_FV_F$ product of upper F layer $502)/(k_BT)]$. As listed in FIG. 15, since $K_{AF}$ of the intermediate AF layer 401 is small, the product of $K_{AF}V_{AF}$ of the intermediate AF layer 401 was ignored.

$(KV)_{eff}/k_BT$ value of the upper F layer 502 at RT was about 1347 if the upper F layer 502 was made of TbFeCo film. Since the $(KV)_{eff}/k_BT$ value of the single TbFeCo layer at RT is about 5.8-7.7 (FIG. 14), the $(KV)_{eff}/k_BT$ value of the upper F layer 502 at RT can be increased to a very high value by "F/AF/F" exchange coupling. In FIG. 5, $H_C$ value when $T_W\approx 200°$ C. was about 1 kOe if the upper F layer 502 is formed of TbFeCo film. Considering that the maximum recording magnetic field of the current head is about 10 kOe, the $H_C$ value when $T_W\approx 200°$ C. was lowered to about 1 kOe, whereby the write (recording) operation on the upper F layer 502 can be done easily. Moreover, since the under layer 200, the lower F layer 301, the intermediate AF layer 401, the upper F layer 502 and the protected layer 600 can be composed of closed packed crystalline sheets, the formation process may be carried out at RT. Although the heating process is required for obtaining $L1_0$-FePt film composing the lower F layer 301, the heating temperature is equal to or lower than 350° C., which is almost equal to the highest heating temperature of the current medium. Thus, there is no problem to put this example to practical use.

From the above, one can conclude that a very high resistance against thermal fluctuation and a high $H_C$ value are obtained in a temperature range between RT and $T_B$ by tri-layer "F/AF/F" exchange coupling (i.e., "lower F layer 301/intermediate AF layer 401/upper F layer 502"). Also, the write capability at high temperature was overcome, and a drastic temperature variation in $H_C$ value (i.e., the large temperature gradient of $H_C$) was obtained around $T_B$ or at right below $T_W$. Furthermore, it was confirmed that the medium formation can be carried out at low temperature. In this manner, by using the tri-layer medium formed of "F/AF/F" exchange coupling (i.e., lower F layer 301/intermediate AF layer 401/upper F layer 502) it becomes possible to realize a thermally assisted magnetic recording medium, which can (1) overcome the resistance against thermal fluctuation at RT and write capability at high temperature; (2) obtain a drastic temperature variation in $H_C$ at right below $T_W$; and (3) be formed at low temperature.

Figure 6:
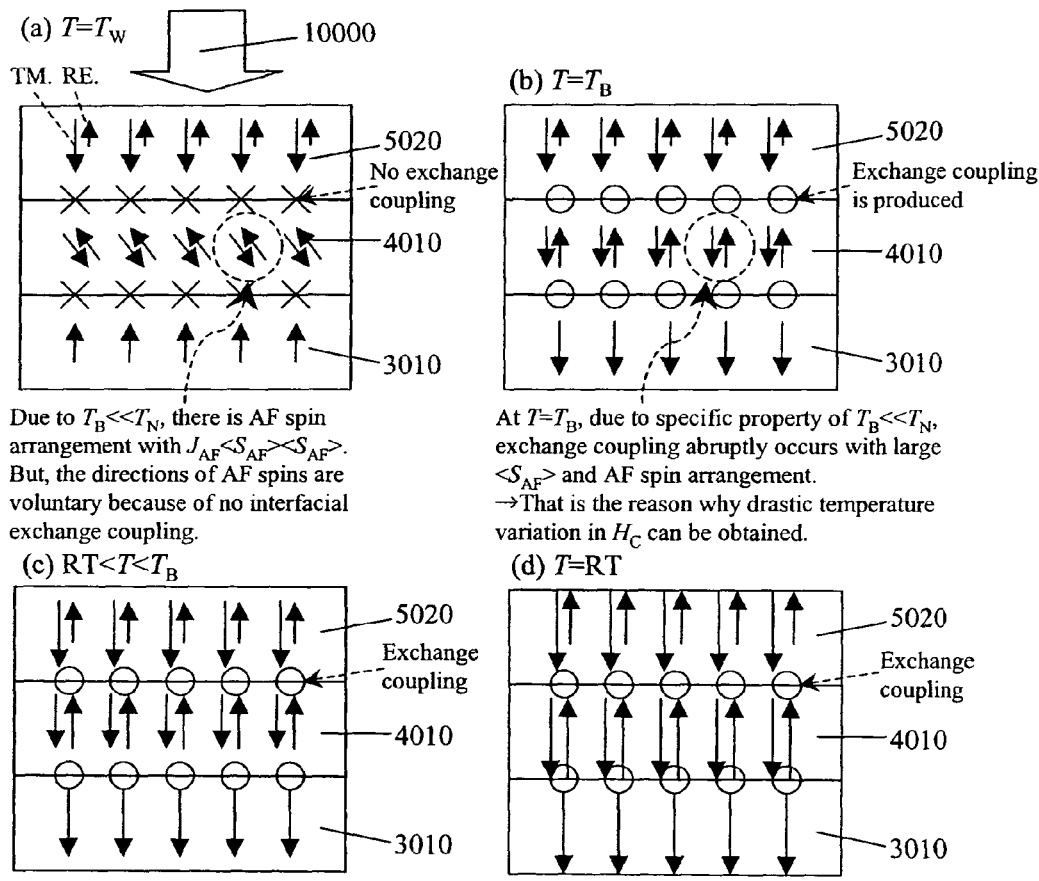
FIG. 6 illustrates a spin arrangement at the time of thermally assisted magnetic recording on the exchange coupled tri-layered magnetic medium for thermally assisted magnetic recording in FIG. 4.

The following will now explain the thermally assisted magnetic recording procedure for the exchange coupled tri-layer medium formed of lower F layer 301/intermediate AF layer 401/upper F layer 502. FIG. 6 illustrates a spin arrangement at the time of thermally assisted magnetic recording of an "F/AF/F" exchange coupled crystal grain formed of "one crystal grain 3010 of lower F layer/one crystal grain 4010 of intermediate AF layer/one crystal grain 5020 of upper F layer." Although it shows the shape of one crystal grain, a magnetization reversal unit reveals the same shape. In the drawing, TM. indicates transition metals, and RE. indicates rare earth. Here, it is assumed that the lower F layer 301 and the crystal grain 3010 of the lower F layer are formed of $L1_0$-FePt, the intermediate AF layer 401 and the crystal grain 4010 of the intermediate AF layer 401 are formed of γ-FeMn, and the upper F layer 502 and the crystal grain 5020 of the upper F layer are formed of TbFeCo. Moreover, $T_C$ of $L1_0$-FePt is about 470° C. (FIG. 16), Neel point ($T_N$) of γ-FeMn is about 217° C. (FIG. 15), and $T_C$ of TbFeCo is about 270° C. (FIG. 14). Since the ideal $T_W$ is about 200° C., the following description will be based on $T_W\approx 200°$ C.

As shown in FIG. 6(a), suppose that the thermal and recording magnetic field 10000 at $T=T_W$ is irradiated and applied from the upper surface of the medium to downward during the thermally assisted magnetic recording process. Since $T_C$ of $L1_0$-FePt is about 470° C., $T_N$ of γ-FeMn is about 217° C., $T_C$ of TbFeCo is about 270° C., which are all higher than $T_W\approx 200°$ C., the magnetic state in one crystal grain composed of "a crystal grain 3010 of lower F layer/a crystal grain 4010 of intermediate AF layer/a crystal grain 5020 of upper F layer" at T=$T_W$ is "F/AF/F." However, since $T_B$ of γ-FeMn is about 155° C., more accurate magnetic state thereof is "F/Para.(interface)/AF/Para.(interface)/F" (Para. is an abbreviation of paramagnetism). Therefore, at T=$T_W$, the magnetization vector in one crystal grain 5020 of the upper F layer is easily turned to downward due to the low $H_C$ of TbFeCo. However, because the exchange coupling is not yet formed, the direction of the AF spin arrangement in one crystal grain 4010 of the intermediate AF layer is arbitrary. Similarly, the direction of the F spin arrangement in one crystal grain 3010 of the lower F layer is arbitrary. This is because the $H_C$ value of the single $L1_0$-FePt layer is very high and disposed at the lowest layer, and is not influenced by the recording magnetic field. But in the drawing, the magnetization vector of one crystal grain 3010 of the lower F layer points upward in consideration of the influence of the demagnetizing field.

As shown in FIG. 6(b), when T=$T_B$, exchange coupling occurs. Accordingly, the magnetic state of one crystal grain formed of "one crystal grain 3010 of lower F layer/one crystal grain 4010 of intermediate AF layer/one crystal grain 5020 of upper F layer" shifts from "F/Para.(interface)/AF/Para.(interface)/F" to "F/AF/F." To make the spin in one crystal grain 5020 of the upper F layer face downward, the spin of each layer, each interface is arranged and field-cooled in frozen state. The internal field generated by the exchange coupling is about several hundred kOe. Due to this magnitude, the AF spin in one crystal grain 4010 of the intermediate AF layer and the F spin in one crystal grain 3010 of the lower F layer are ordered as shown in FIG. 6(b).

Because of the property "$T_B \ll T_N$", at T=$T_B$, one crystal grain 4010 of the intermediate AF layer has a relatively large <$S_{AF}$>, and therefore there is the AF spin arrangement with a relatively large $J_{AF}$<$S_{AF}$><$S_{AF}$>. At T=$T_B$, "F/AF/F" exchange coupling abruptly occurs with large <$S_{AF}$> and $J_{AF}$<$S_{AF}$><$S_{AF}$>, so $H_C$ at T=$T_B$ rapidly increases. This is the reason why a drastic temperature variation in $H_C$ is obtained at T=$T_B$, and is a physical phenomenon obtained based on the specific property of "$T_B \ll T_N$."

As shown in FIG. 6(c), when RT<T<$T_B$, the magnetization vector of each layer is increased, and keeps increasing when T=RT and stops as shown in FIG. 6(d). In one crystal grain 5020 of the upper F layer, an increase of spin size due to the temperature decline of RE.spin is greater than an increase of spin size due to the temperature decline of TM.spin. Thus, RE.spin and TM.spin are increased. When T=RT, the difference between the RE.spin size and the TM.spin size becomes small down to $M_S$≈50 emu/cm³. If the reproduction sensitivity lacks due to the low $M_S$, a reproduction exclusive layer such as amorphous DyTbFeCo film having $M_S$ value of about 300 emu/cm³ at RT may be formed on the upper F layer 502. So far, the thermally assisted magnetic recording procedure has been explained. The upward recording procedure is only the opposite of the magnetization vector.

Also, the lower F layer 301 of the present invention may be formed of $L1_0$-CoPt film or $L1_0$-FePtNi film. As summarized in FIG. 17, (a) (KV)$_{eff}/k_B T$ value of the upper F layer 502 at RT is about 543 and $H_C$ value thereof is about 284-377 kOe even in the combination where the lower F layer 301 is formed of $L1_0$-CoPt film and the upper F layer 502 is formed of TbFeCo film; and (b) (KV)$_{eff}/k_B T$ value of the upper F layer 502 at RT is about 772 and $H_C$ value thereof is about 404-537 kOe even in the combination where the lower F layer 301 is formed of $L1_0$-FePtNi film and the upper F layer 502 is formed of TbFeCo film. Although the heating process is required for obtaining the $L1_0$-CoPt film or $L1_0$-FePtNi film, since the process may be conducted at 350° C. at most, there is no problem to put it into practical use.

As summarized in FIG. 15, the intermediate AF layer 401 according to this embodiment of the invention may be formed of one of γ-MnIr film, γ-MnRh film, γ-MnNi film, γ-MnRu film, γ-MnPt film, γ-MnPd film, γ-Mn(PtRh) film, and γ-Mn(RuRh) film. Also, to make $T_B$ below 200° C., the Ir composition, Rh composition, Ru composition, Ni composition, Pt composition, Pd composition, (PtRh) composition, and (RuRh) composition are less than 20 at.%, respectively.

As shown in FIG. 15, $K_{AF}$ value of the AF layer is the same as that of γ-FeMn film, and $T_B$ value of the AF layer is the same as that of γ-FeMn film, and the AF layer has the property of "$T_B \ll T_N$".

Also, as can be seen in FIG. 15, in case of γ-MnIr film, γ-MnRh film, and γ-MnRu film, the difference between $T_B$ and $T_N$ is great. Therefore, by using the AF layer thereof, the property of "$T_B \ll T_N$" becomes more effective. Namely, during the thermally assisted magnetic recording procedure, at T=$T_B$, the "F/AF/F" exchange coupling abruptly occurs with larger <$S_{AF}$> and $J_{AF}$<$S_{AF}$><$S_{AF}$>, so it becomes possible to increase the temperature gradient of $H_C$ at T=$T_B$.

Moreover, the length of one side of the closely packed hexagonal lattice in the surface (111) of the γ-MnIr film, γ-MnRh film, and γ-MnRu film is almost equal to the length of one side of the closely packed hexagonal lattice in the surface (111) of the $L1_0$-FePt film, $L1_0$-CoPt, and $L1_0$-FePtNi film composing the lower F layer 301. Hence, by forming the intermediate AF layer 401 with the γ-MnIr film, γ-MnRh film, and γ-MnRu film, lattice mismatch problem can be avoided. In consequence, it becomes possible to obtain $H_C$ value or (KV)$_{eff}/k_B T$ value close to the theoretical values (i.e., calculation results shown in FIG. 17), and the anisotropy dispersion of the upper F layer 502 can be kept small.

Furthermore, in the case of raising $T_W$ higher than 200° C., it is desirable to use the γ-MnIr film, γ-MnRh film, and γ-MnRu film having more than 20 at.% of Ir composition, Rh composition and Ru composition, respectively, as the intermediate AF layer 401. The resulting AF layer thereof has about 240-300° C. $T_B$ value, and it becomes possible to adjust the $T_B$ value to a desired value, i.e., right below the $T_W$, by the Ir composition, Rh composition, and Ru composition.

However, the γ-MnIr film, γ-MnRh film, and γ-MnRu film increase the cost. Thus, when using the AF layer made of such films, trade-off is necessary between the magnetic physical property value and the cost problem.

So far, the magnetic recording with perpendicular anisotropy in the exchange coupled tri-layered magnetic medium has been explained. However, the development is also possible for magnetic recording with in-plane anisotropy and magnetic recording with inclined anisotropy.

Example 3

Figure 7:
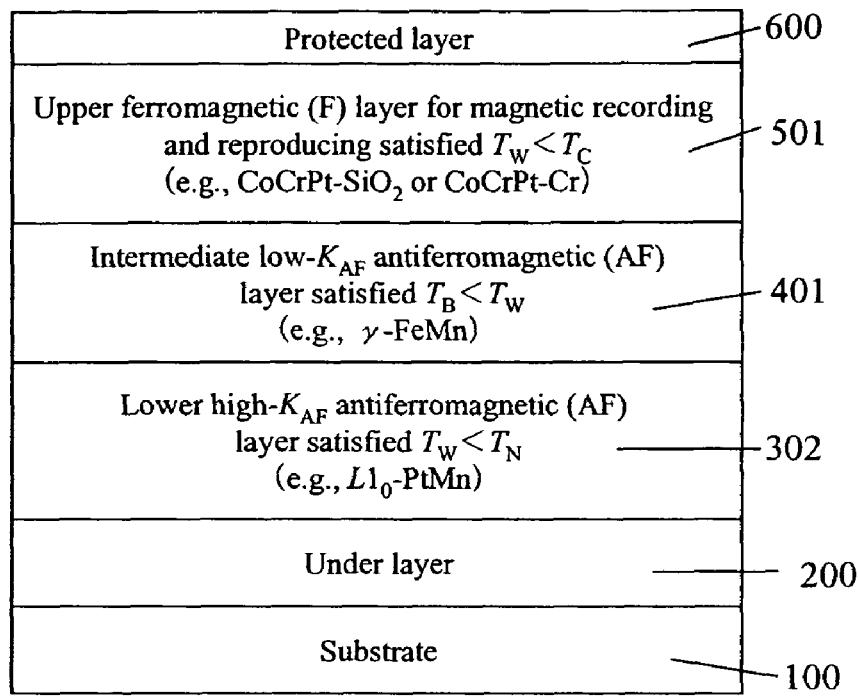
FIG. 7 is an enlarged cross sectional view of an exchange coupled tri-layered magnetic medium for thermally assisted magnetic recording formed of a lower antiferromagnetic layer/intermediate antiferromagnetic layer/upper ferromagnetic layer for recording and reproducing, according to another embodiment of the present invention.

FIG. 7 illustrates an exchange coupled tri-layered magnetic medium for thermally assisted magnetic recording, according to another embodiment of the present invention. The medium has a layered structure formed of an under layer 200 disposed on a substrate 100, a lower high-$K_{AF}$ antiferromagnetic (AF) layer 302 satisfying $T_W$<$T_N$, an intermediate low-$K_{AF}$ antiferromagnetic (AF) layer 401 satisfying $T_B$<$T_W$, an upper ferromagnetic (F) layer 501 satisfying $T_W$<$T_C$, and a protected layer 600. The substrate 100 is made of glass, the under layer 200 is formed of a Ru film, the lower AF layer 302 is formed of L1$_0$-PtMn film, the intermediate AF layer 401 is formed of γ-FeMn film, the upper F layer 501 is formed of CoCrPt—SiO$_2$ (or CoCrPt—Cr film), and the protected layer 600 is formed of C film. In the case where the thermally assisted magnetic recording medium is formed at low temperature, the closely packed surface of each layer Ru(001)/L1$_0$-PtMn(111)/γ-FeMn(111)/CoCrPt—SiO$_2$(001) (or CoCrPt—Cr(001)) crystalline alignment can be obtained, so perpendicular magnetized film is formed. The typical thickness for each layer is 20 nm for the under layer 200, 10 nm for the lower AF layer 302, 10 nm for the intermediate AF layer 401, 10 nm for the upper F layer 501, and 3 nm for the protected layer 600.

Figure 8:
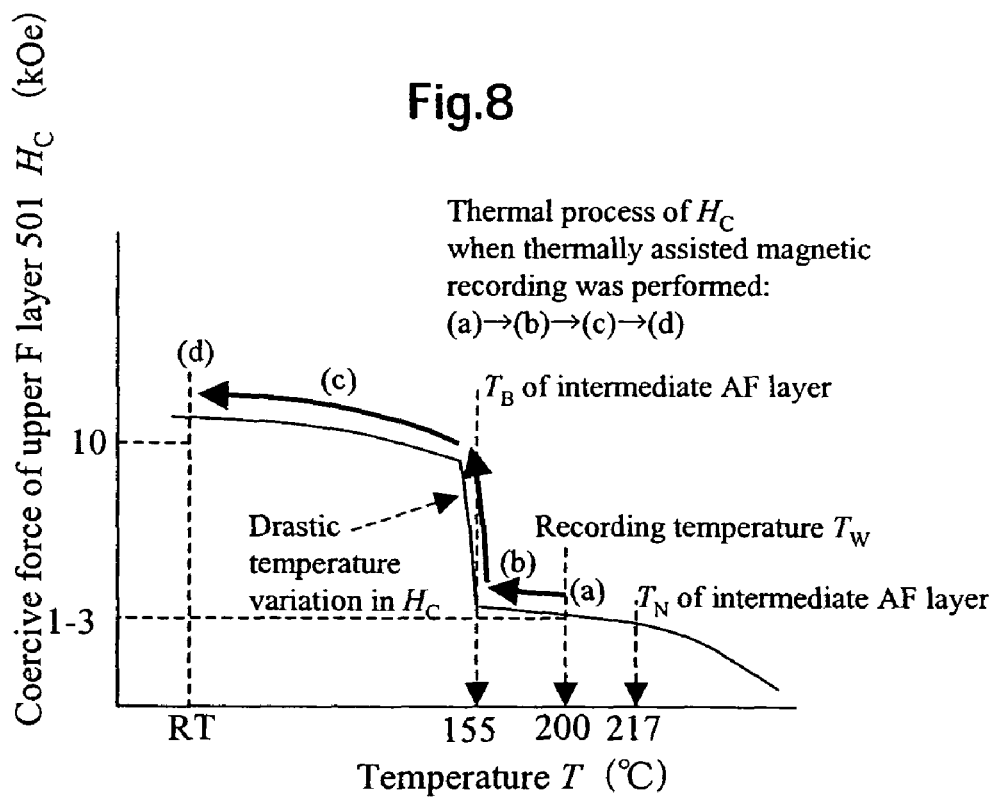
FIG. 8 illustrates the dependency of the coercive force of the upper ferromagnetic layer in the exchange coupled tri-layered magnetic medium for thermally assisted magnetic recording in FIG. 7 on the temperature.

FIG. 8 illustrates the dependency of the coercive force (H$_C$) of the upper F layer in the exchange coupled tri-layered magnetic medium for thermally assisted magnetic recording on the temperature (T). Particularly, the graph shows the relation between H$_C$ and T in the case where the lower AF layer 302 is formed of 10 nm-thick L1$_0$-PtMn film, the intermediate AF layer 401 is made of 10 nm-thick γ-FeMn film, and the upper F layer 501 is made of 10 nm-thick CoCrpt-SiO$_2$ film or CoCrPt—Cr film. The H$_C$ value of the upper F layer 501 at RT is very large by the "AF/AF/F" exchange coupling of the tri-layer "lower AF layer 302/intermediate AF layer 401/upper F layer 501." As summarized in FIG. 17, in the case where the upper F layer 501 is formed of CoCrpt-SiO$_2$ film its H$_C$ value is approximately 11 kOe, and in the case where the upper F layer 501 is formed of CoCrPt—Cr film its H$_C$ value is approximately 10 kOe.

For approximate calculation of H$_C$ value, a weighted average was used. Using the K$_F$ value and H$_C$ value of the upper F layer 501 shown in FIG. 14 and the K$_{AF}$ value of the lower AF layer 302 shown in FIG. 16, the H$_C$ value was calculated using the following formula: [(K$_{AF}$V$_{AF}$ of lower AF layer 302+K$_F$V$_F$ of upper F layer 501)/(V$_{AF}$ value of lower AF layer 302+V$_F$ value of upper F layer 501)]×[1/(K$_F$ value of the single upper F layer 501 at RT)×(H$_C$ value of the single upper F layer 501 at RT)]. As summarized in FIG. 15, since K$_{AF}$ of the intermediate AF layer 401 is small, the product of K$_{AF}$V$_{AF}$ of the intermediate AF layer 401 was ignored.

Now that the H$_C$ value of the single CoCrPt—SiO$_2$ layer at RT is approximately 5-6 kOe and the H$_C$ value of the single CoCrPt—Cr layer at RT is approximately 2-3 kOe (FIG. 14), it can be increased to a very high value by the "AF/AF/F" exchange coupling. Moreover, the greatest H$_C$ value of the upper F layer 501 at RT gradually decreases by heating according to the Brillouin function, and rapidly decreases when T$_B$ of the intermediate AF layer 401 is approximately 155° C. and T$_W$≈200° C. (that is, at a temperature where the "AF/AF/F" exchange coupling disappears), and afterward is dependent on the H$_C$ vs. temperature of the single upper F layer 501. The H$_C$ value when T$_W$≈200° C. was about 2-3 kOe if the upper F layer 501 is formed of CoCrPt—SiO$_2$ film, and about 1-1.5 kOe if the upper F layer 501 is made of CoCrPt—Cr film. FIG. 8 particularly illustrates that a drastic temperature variation (in step or stair shape) in H$_C$ value was obtained around T$_B$ value or right below T$_W$.

Moreover, FIG. 17 lists (KV)$_{eff}$/k$_B$T values of the upper F layer 501 of the exchange coupled tri-layered magnetic media at RT. Here, (KV)$_{eff}$/k$_B$T value was calculated using the formula of [(K$_{AF}$V$_{AF}$ product of lower AF layer 302)+(K$_F$V$_F$ product of upper F layer 501)/(k$_B$T)]. As listed in FIG. 15, since K$_{AF}$ of the intermediate AF layer 401 is small, the product of K$_{AF}$V$_{AF}$ of the intermediate AF layer 401 was ignored. (KV)$_{eff}$/k$_B$T value of the upper F layer 501 at RT was about 268 if the upper F layer 501 was made of CoCrPt—SiO$_2$ film, whereas about 229 if the upper F layer 501 was made of CoCrPt—Cr film. Since the (KV)$_{eff}$/k$_B$T value of the single CoCrPt—SiO$_2$ layer at RT is about 77, and (KV)$_{eff}$/k$_B$T value of the single CoCrPt—Cr layer is about 38 (FIG. 14), the (KV)$_{eff}$/k$_B$T value of the upper F layer 501 at RT can be increased to a very high value by "AF/AF/F" exchange coupling. In FIG. 8, H$_C$ value when T$_W$≈200° C. was about 2-3 kOe if the upper F layer 501 is formed of CoCrPt—SiO$_2$ film, and about 1-1.5 kOe if the upper F layer 501 is made of CoCrPt—Cr film. Considering that the maximum recording magnetic field of the current head is about 10 kOe, the H$_C$ value when T$_W$≈200° C. was lowered to about 2-3 kOe (CoCrPt—SiO$_2$ film) or about 1-1.5 kOe (CoCrPt—Cr film), whereby the write (recording) operation on the upper F layer 501 can be done easily. Moreover, since the under layer 200, the lower AF layer 302, the intermediate AF layer 401, the upper F layer 501 and the protected layer 600 can be composed of closed packed crystalline sheets, the formation process may be carried out at RT. Although the heating process is required for obtaining L1$_0$-PtMn film composing the lower AF layer 302, the heating temperature is about 250° C. Thus, there is no problem to put this example to practical use.

From the above, one can conclude that a very high resistance against thermal fluctuation and a high H$_C$ value are obtained in a temperature range between RT and T$_B$ by tri-layer "AF/AF/F" exchange coupling (i.e., "lower AF layer 302/intermediate AF layer 401/upper F layer 501"). Also, the write capability at high temperature was overcome, and a drastic temperature variation in H$_C$ value (i.e., the large temperature gradient of H$_C$) was obtained around T$_B$ or at right below T$_W$. Further, it was confirmed that the medium formation can be carried out at low temperature. In this manner, by using the tri-layer medium formed of "AF/AF/F" exchange coupling (i.e., lower AF layer 302/intermediate AF layer 401/upper F layer 501) it becomes possible to realize a thermally assisted magnetic recording medium, which can (1) overcome the resistance against thermal fluctuation at RT and write capability at high temperature; (2) obtain a drastic temperature variation in H$_C$ at right below T$_W$; and (3) be formed at low temperature.

Figure 9:
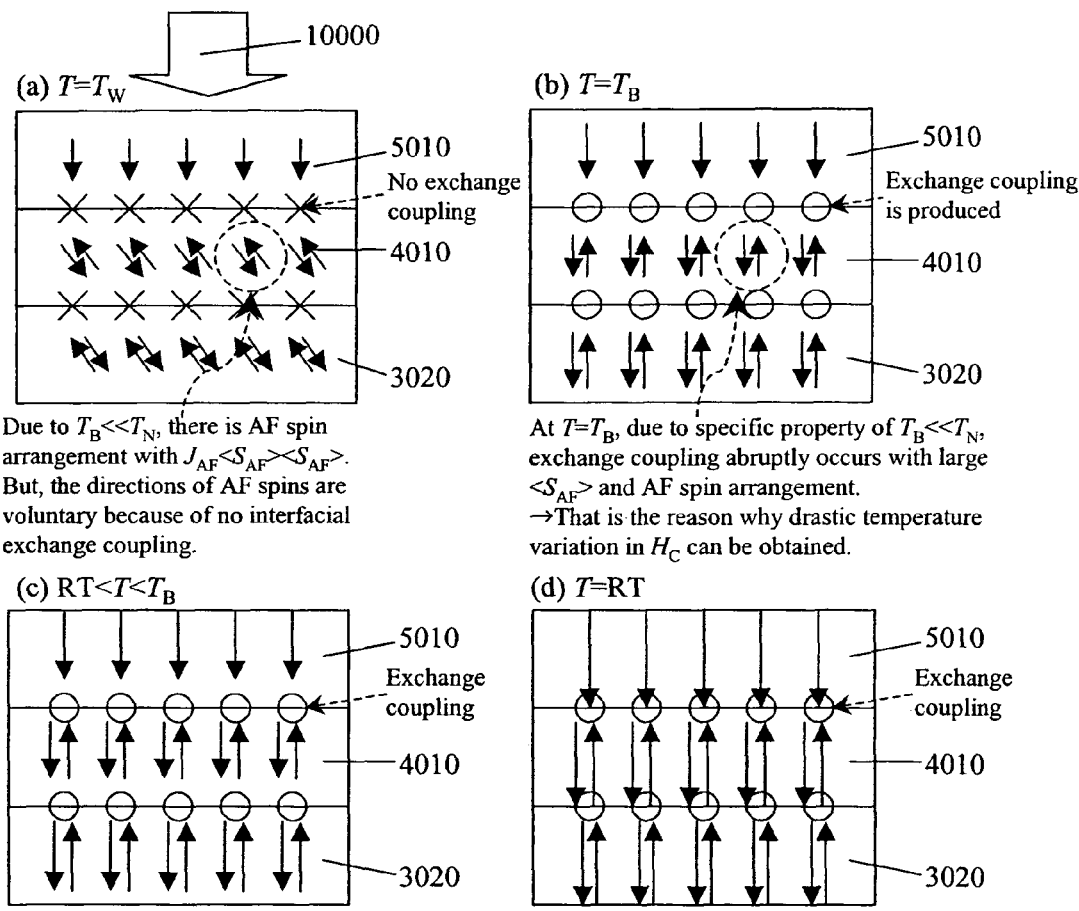
FIG. 9 illustrates a spin arrangement at the time of thermally assisted magnetic recording on the exchange coupled tri-layered magnetic medium for thermally assisted magnetic recording in FIG. 7.

The following will now explain the thermally assisted magnetic recording procedure for the exchange coupled tri-layer medium formed of lower AF layer 302/intermediate AF layer 401/upper F layer 501. FIG. 9 illustrates a spin arrangement at the time of thermally assisted magnetic recording of an "AF/AF/F" exchange coupled crystal grain formed of "one crystal grain 3020 of lower AF layer/one crystal grain 4010 of intermediate AF layer/one crystal grain 5010 of upper F layer." Although it shows the shape of one crystal grain, a magnetization reversal unit reveals the same shape. In this case, it is assumed that the lower AF layer 302 and the crystal grain 3020 of the lower AF layer are formed of L1$_0$-PtMn, the intermediate AF layer 401 and the crystal grain 4010 of the intermediate AF layer 401 are formed of γ-FeMn, and the upper F layer 501 and the crystal grain 5010 of the upper F layer are formed of CoCrPt—SiO$_2$ (or CoCrPt—Cr). Moreover, T$_N$ of L1$_0$-PtMn is about 700° C. (FIG. 16), Neel point (T$_N$) of γ-FeMn is about 217° C. (FIG. 15), T$_C$ of CoCrPt—SiO$_2$ is about 600° C., and T$_C$ of CoCrPt—Cr is about 427° C. (FIG. 14). Since the ideal T$_W$ is about 200° C., the following description will be based on T$_W$≈200° C.

As shown in FIG. 9(a), suppose that the thermal and recording magnetic field 10000 at T=T$_W$ is irradiated and applied from the upper surface of the medium to downward during the thermally assisted magnetic recording process. Since T$_N$ of L1$_0$-PtMn is about 700° C., T$_N$ of γ-FeMn is about 217° C., T$_C$ of CoCrPt—SiO$_2$ is about 600° C. (or T$_C$ of CoCrPt—Cr is about 427° C.), which are all higher than $T_W \approx 200°$ C., the magnetic state in one crystal grain composed of "a crystal grain 3020 of lower AF layer/a crystal grain 4010 of intermediate AF layer/a crystal grain 5010 of upper F layer" at T=$T_W$ is "AF/AF/F." However, since $T_B$ of γ-FeMn is about 155° C., more accurate magnetic state thereof is "AF/Para.(interface)/AF/Para.(interface)/F." Therefore, at T=$T_W$, the magnetization vector in one crystal grain 5010 of the upper F layer is easily turned to downward due to the low $H_C$ of CoCrPt—SiO$_2$ (or the low $H_C$ of CoCrPt—Cr). However, because the exchange coupling is not yet formed, the direction of the AF spin arrangement in one crystal grain 4010 of the intermediate AF layer is arbitrary. Similarly, the direction of the AF spin arrangement in one crystal grain 3020 of the lower AF layer is arbitrary.

As shown in FIG. 9(b), when T=$T_B$, the exchange coupling occurs. Accordingly, the magnetic state of one crystal grain formed of "one crystal grain 3020 of lower AF layer/one crystal grain 4010 of intermediate AF layer/one crystal grain 5010 of upper F layer" shifts from "AF/Para.(interface)/AF/Para.(interface)/F" to "AF/AF/F." To make the spin in one crystal grain 5010 of the upper F layer face downward, the spin of each layer, each interface is arranged and field-cooled in frozen state. The internal field generated by the exchange coupling is about several hundred kOe. Due to this magnitude, the AF spin in one crystal grain 4010 of the intermediate AF layer and the AF spin in one crystal grain 3020 of the lower AF layer are ordered as shown in FIG. 9(b).

Because of the property "$T_B \ll T_N$," at T=$T_B$, one crystal grain 4010 of the intermediate AF layer has a relatively large $<S_{AF}>$, and therefore there is the AF spin arrangement with a relatively large $J_{AF}<S_{AF}><S_{AF}>$. At T=$T_B$, "AF/AF/F" exchange coupling abruptly occurs with large $<S_{AF}>$ and $J_{AF}<S_{AF}><S_{AF}>$, so $H_C$ at T=$T_B$ rapidly increases. This is the reason why a drastic temperature variation in $H_C$ is obtained at T=$T_B$, and is a physical phenomenon obtained based on the specific property of "$T_B \ll T_N$."

As shown in FIG. 9(c), when RT<T<$T_B$, the magnetization vector of each layer is increased, and keeps increasing when T=RT and stops as shown in FIG. 9(d). So far, the thermally assisted magnetic recording procedure has been explained. The upward recording procedure is only the opposite of the magnetization vector.

Also, the lower AF layer 302 of the present invention may be formed of L1$_0$-(PtPd)Mn film. As summarized in FIG. 17, (a) (KV)$_{eff}$/k$_B$T value of the upper F layer 501 at RT is about 268 and $H_C$ value thereof is about 11 kOe even in the combination where the lower AF layer 302 is formed of L1$_0$-(PtPd)Mn film and the upper F layer 501 is formed of CoCrPt—SiO$_2$ film; and (b) (KV)$_{eff}$/k$_B$T value of the upper F layer 501 at RT is about 229 and $H_C$ value thereof is about 10 kOe even in the combination where the lower AF layer 302 is formed of L1$_0$-(PtPd)Mn film and the upper F layer 501 is formed of CoCrPt—Cr film. Although the heating process is required for obtaining L1$_0$-(PtPd)Mn film, since the process may be conducted at 250° C. at most, there is no problem to put it into practical use.

As summarized in FIG. 15, the intermediate AF layer 401 according to this embodiment of the invention may be formed of one of γ-MnIr film, γ-MnRh film, γ-MnNi film, γ-MnRu film, γ-MnPt film, γ-MnPd film, γ-Mn(PtRh) film, and γ-Mn(RuRh) film. Also, to make $T_B$ below 200° C., the Ir composition, Rh composition, Ru composition, Ni composition, Pt composition, Pd composition, (PtRh) composition, and (RuRh) composition are less than 20 at.%, respectively.

As shown in FIG. 15, K$_{AF}$ value of the AF layer is the same as that of γ-FeMn film, and $T_B$ value of the AF layer is the same as that of γ-FeMn film, and the AF layer has the property of "$T_B \ll T_N$."

Also, as can be seen in FIG. 15, in case of γ-MnIr film, γ-MnRh film, and γ-MnRu film, the difference between $T_B$ and $T_N$ is great. Therefore, by using the AF layer thereof, the property of "$T_B \ll T_N$" becomes more effective. Namely, during the thermally assisted magnetic recording procedure, at T=$T_B$, the "AF/AF/F" exchange coupling abruptly occurs with larger $<S_{AF}>$ and $J_{AF}<S_{AF}><S_{AF}>$, so it becomes possible to increase the temperature gradient of $H_C$ at T=$T_B$.

Moreover, the length of one side of the closely packed hexagonal lattice in the surface (111) of the γ-MnIr film, γ-MnRh film, and γ-MnRu film is almost equal to the length of one side of the closely packed hexagonal lattice in the surface (111) of the L1$_0$-PtMn film or L1$_0$-(PtPd)Mn film composing the lower AF layer 302, and to the length of one side of the closely packed hexagonal lattice in the surface (001) of the CoCrPt—SiO$_2$ film (or the surface (001) of the CoCrPt—Cr film) composing the upper F layer 501. Hence, by forming the intermediate AF layer 401 with the γ-MnIr film, γ-MnRh film, and γ-MnRu film, lattice mismatch problem can be avoided. In consequence, it becomes possible to obtain $H_C$ value or (KV)$_{eff}$/k$_B$T value close to the theoretical values (i.e., calculation results shown in FIG. 17), and the anisotropy dispersion of the upper F layer 501 can be kept small.

Furthermore, in the case of raising $T_W$ higher than 200° C., it is desirable to use the γ-MnIr film, γ-MnRh film, and γ-MnRu film having more than 20 at.% of Ir composition, Rh composition and Ru composition, respectively, as the intermediate AF layer 401. The resulting AF layer thereof has about 240-300° C. $T_B$ value, and it becomes possible to adjust the $T_B$ value to a desired value, i.e., right below the $T_W$, by the Ir composition, Rh composition, and Ru composition.

However, the γ-MnIr film, γ-MnRh film, and γ-MnRu film increase the cost. Thus, when using the AF layer made of such films, trade-off is necessary between the magnetic physical property value and the cost problem.

So far, the magnetic recording with perpendicular anisotropy in the exchange coupled tri-layered magnetic medium has been explained. However, the development is also possible for magnetic recording with in-plane anisotropy and magnetic recording with inclined anisotropy.

Example 4

Figure 10:
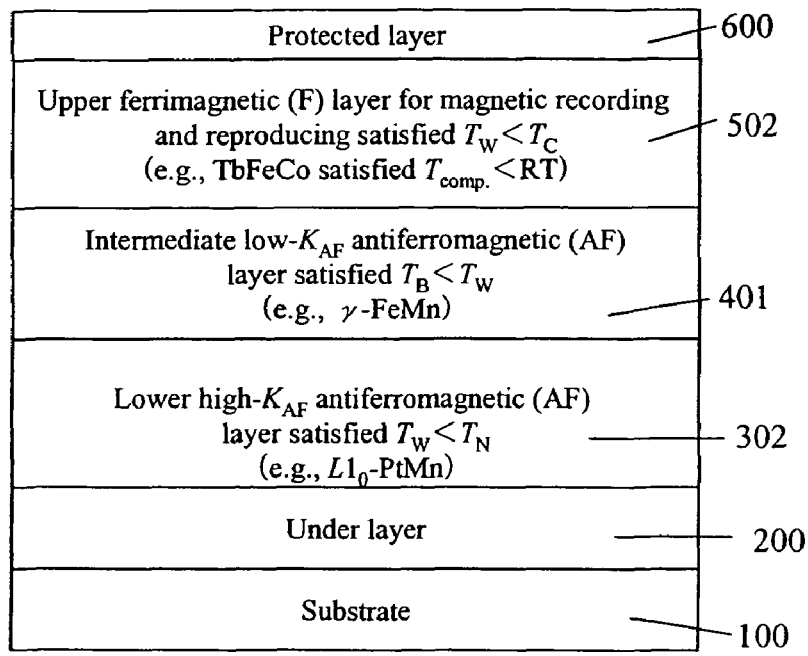
FIG. 10 is an enlarged cross sectional view of an exchange coupled tri-layered magnetic medium for thermally assisted magnetic recording formed of a lower antiferromagnetic layer/intermediate antiferromagnetic layer/upper ferrimagnetic layer for recording and reproducing, according to another embodiment of the present invention.

FIG. 10 illustrates an exchange coupled tri-layered magnetic medium for thermally assisted magnetic recording, according to another embodiment of the present invention. The medium has a layered structure formed of an under layer 200 disposed on a substrate 100, a lower high-K$_{AF}$ antiferromagnetic (AF) layer 302 satisfying $T_W<T_N$, an intermediate low-K$_{AF}$ antiferromagnetic (AF) layer 401 satisfying $T_B<T_W$, an upper ferrimagnetic (F) layer 502 for recording and reproducing, satisfying $T_W<T_C$, and a protected layer 600. The substrate 100 is made of glass, the under layer 200 is formed of a Ru film, the lower AF layer 302 is formed of L1$_0$-PtMn film, the intermediate AF layer 401 is formed of γ-FeMn film, the upper F layer 502 is formed of amorphous TbFeCo film having magnetization compensation point $T_{Comp.} \leq 0°$ C., and the protected layer 600 is formed of C film. In the case where the thermally assisted magnetic recording medium is formed at low temperature, the closely packed surface of each layer Ru(001)/L1$_0$-PtMn(111)/γ-FeMn(111)/amorphous TbFeCo crystalline alignment can be obtained, so perpendicular magnetized film is formed. The typical thickness for each layer is 20 nm for the under layer 200, 10 nm for the lower AF layer 302, 10 nm for the intermediate AF layer 401, 10 nm for the upper F layer 502, and 3 nm for the protected layer 600.

Figure 11:
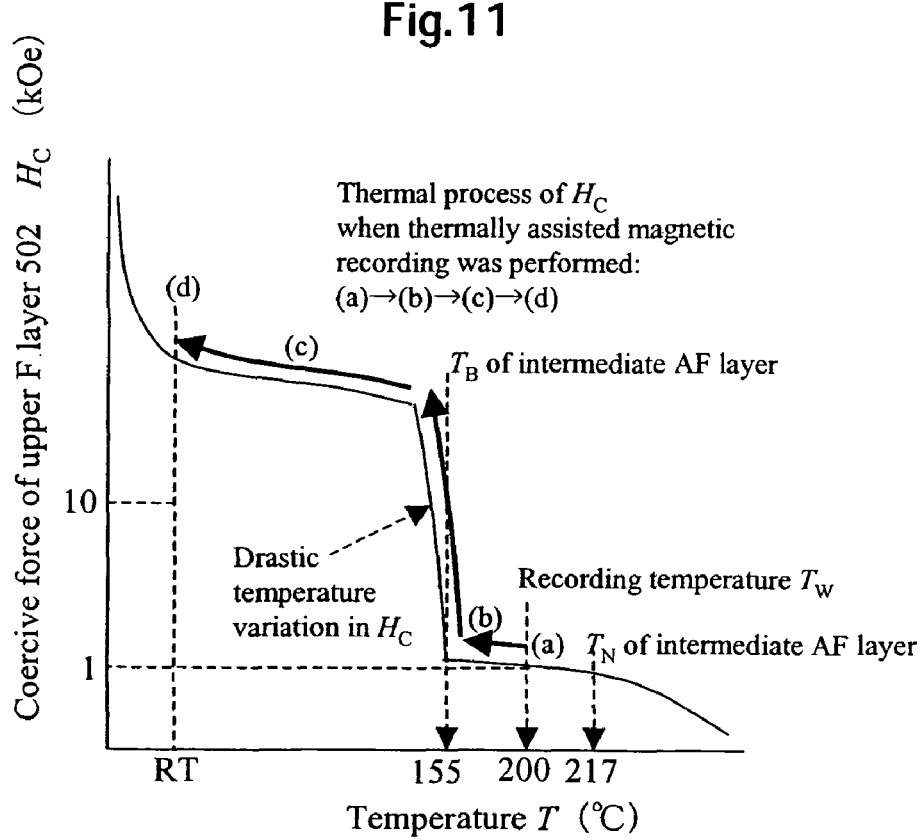
FIG. 11 illustrates the dependency of the coercive force of the upper ferrimagnetic layer in the exchange coupled tri-layered magnetic medium for thermally assisted magnetic recording in FIG. 10 on the temperature.

FIG. 11 illustrates the dependency of the coercive force ($H_C$) of the upper F layer 502 in the exchange coupled tri-layered magnetic medium for thermally assisted magnetic recording on the temperature (T). Particularly, the graph shows the relation between $H_C$ and T in the case where the lower AF layer 302 is formed of 10 nm-thick $L1_0$-PtMn film, the intermediate AF layer 401 is made of 10 nm-thick γ-FeMn film, and the upper F layer 502 is made of 10 nm-thick TbFeCo film. The $H_C$ value of the upper F layer 502 at RT is very large by the "AF/AF/F" exchange coupling of the tri-layer "lower AF layer 302/intermediate AF layer 401/upper F layer 502." As summarized in FIG. 17, in the case where the upper F layer 502 is formed of TbFeCo film its $H_C$ value is approximately 137 kOe.

For approximate calculation of $H_C$ value, a weighted average was used. Using the $K_F$ value and $H_C$ value of the upper F layer 502 shown in FIG. 14 and the $K_{AF}$ value of the lower AF layer 302 shown in FIG. 16, the $H_C$ value was calculated using the following formula:

$[(K_{AF} X v_{AF}$ of lower AF layer 302+$K_F x V_F$ of upper F layer 502)/($V_{AF}$ value of lower AF layer 302+$V_F$ value of upper F layer 502)]×[1/($K_F$ value of the single upper F layer 502 at RT)×($H_C$ value of the single upper F layer 502 at RT)]. As summarized in FIG. 15, since $K_{AF}$ of the intermediate AF layer 401 is small, the product of $K_{AF}V_{AF}$ of the intermediate AF layer 401 was ignored.

Now that the $H_C$ value of the single TbFeCo layer at RT is approximately 8 kOe (FIG. 14), it can be increased to a very high value by the "AF/AF/F" exchange coupling, and it actually highly exceeds the maximum magnetic field 10 kOe of a recording head. Moreover, the greatest $H_C$ value of the upper F layer 502 at RT gradually decreases by heating according to the Brillouin function, and rapidly decreases when $T_B$ of the intermediate AF layer 401 is approximately 155° C. and $T_W$≈200° C. (that is, at a temperature where the "AF/AF/F" exchange coupling disappears), and afterward is dependent on the $H_C$ vs. temperature of the single upper F layer 502. The $H_C$ value when $T_W$≈200° C. was about 1 kOe if the upper F layer 502 is formed of TbFeCo film. FIG. 11 particularly illustrates that a drastic temperature variation (in step or stair shape) in $H_C$ value was obtained around $T_B$ value or right below $T_W$.

Moreover, FIG. 17 lists $(KV)_{eff}/k_BT$ values of the upper F layer 502 of the exchange coupled tri-layered magnetic media at RT. Here, $(KV)_{eff}/k_BT$ value was calculated using the formula of $[(K_{AF}V_{AF}$ product of lower AF layer 302)+$(K_FV_F$ product of upper F layer 502)/($k_BT$)]. As listed in FIG. 15, since $K_{AF}$ of the intermediate AF layer 401 is small, the product of $K_{AF}V_{AF}$ of the intermediate AF layer 401 was ignored.

$(KV)_{eff}/k_BT$ value of the upper F layer 502 at RT was about 198 if the upper F layer 502 was made of TbFeCo film. Since the $(KV)_{eff}/k_BT$ value of the single TbFeCo layer at RT is about 5.8-7.7 (FIG. 14), the $(KV)_{eff}/k_BT$ value of the upper F layer 502 at RT can be increased to a very high value by "AF/AF/F" exchange coupling. In FIG. 11, $H_C$ value when $T_W$≈200° C. was about 1 kOe if the upper F layer 502 is formed of TbFeCo film. Considering that the maximum recording magnetic field of the current head is about 10 kOe, the $H_C$ value when $T_W$≈200° C. was lowered to about 1 kOe, whereby the write (recording) operation on the upper F layer 502 can be done easily. In addition, since the under layer 200, the lower AF layer 302, the intermediate AF layer 401, the upper F layer 502 and the protected layer 600 can be composed of closed packed crystalline sheets, the formation process may be carried out at RT. Although the heating process is required for obtaining $L1_0$-PtMn film composing the lower AF layer 302, the heating temperature is equal to or lower than 250° C. Thus, there is no problem to put this example to practical use.

From the above, one can conclude that a very high resistance against thermal fluctuation and a high $H_C$ value are obtained in a temperature range between RT and $T_B$ by tri-layer "AF/AF/F" exchange coupling (i.e., "lower AF layer 302/intermediate AF layer 401/upper F layer 502"). Also, the write capability at high temperature was overcome, and a drastic temperature variation in $H_C$ value (i.e., the large temperature gradient of $H_C$) was obtained around $T_B$ or at right below $T_W$. Furthermore, it was confirmed that the medium formation can be carried out at low temperature. In this manner, by using the tri-layer medium formed of "AF/AF/F" exchange coupling (i.e., lower AF layer 302/intermediate AF layer 401/upper F layer 502) it becomes possible to realize a thermally assisted magnetic recording medium, which can (1) overcome the resistance against thermal fluctuation at RT and write capability at high temperature; (2) obtain a drastic temperature variation in $H_C$ at right below $T_w$; and (3) be formed at low temperature.

Figure 12:
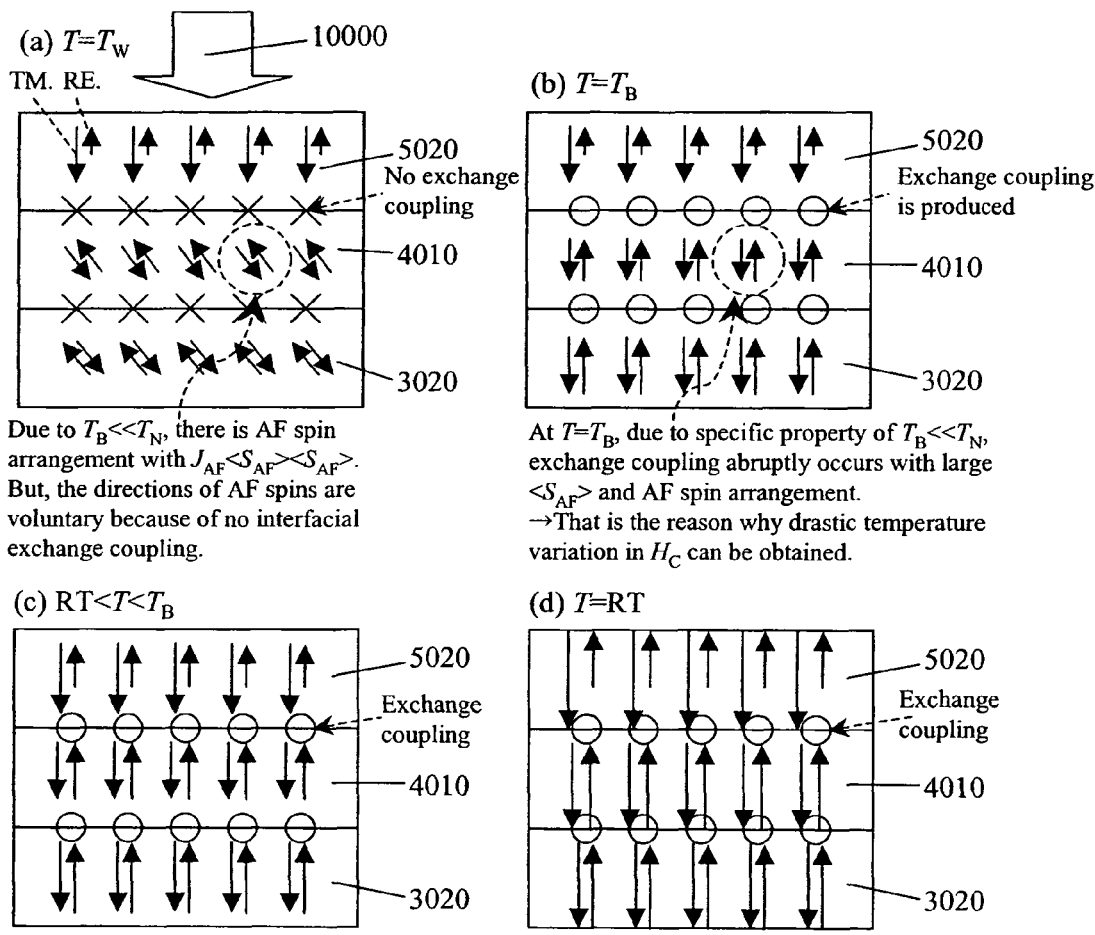
FIG. 12 illustrates a spin arrangement at the time of thermally assisted magnetic recording on the exchange coupled tri-layered magnetic medium for thermally assisted magnetic recording in FIG. 10.

The following will now explain the thermally assisted magnetic recording procedure for the exchange coupled tri-layer medium formed of lower AF layer 302/intermediate AF layer 401/upper F layer 502. FIG. 12 illustrates a spin arrangement at the time of thermally assisted magnetic recording of an "AF/AF/F" exchange coupled crystal grain formed of "one crystal grain 3020 of lower AF layer/one crystal grain 4010 of intermediate AF layer/one crystal grain 5020 of upper F layer." Although it shows the shape of one crystal grain, a magnetization reversal unit reveals the same shape. In the drawing, TM. indicates transition metals, and RE. indicates rare earth. Here, it is assumed that the lower AF layer 302 and the crystal grain 3020 of the lower AF layer are formed of $L1_0$-PtMn, the intermediate AF layer 401 and the crystal grain 4010 of the intermediate AF layer 401 are formed of γ-FeMn, and the upper F layer 502 and the crystal grain 5020 of the upper F layer are formed of TbFeCo. Moreover, $T_N$ of $L1_0$-PtMn is about 700° C. (FIG. 16), Neel point ($T_N$) of γ-FeMn is about 217° C. (FIG. 15), and $T_C$ of TbFeCo is about 270° C. (FIG. 14). Since the ideal $T_W$ is about 200° C., the following description will be based on $T_W$≈200° C.

As shown in FIG. 12(a), suppose that the thermal and recording magnetic field 10000 at T=$T_W$ is irradiated and applied from the upper surface of the medium to downward during the thermally assisted magnetic recording process. Since $T_N$ of $L1_0$-PtMn is about 700° C., $T_N$ of γ-FeMn is about 217° C., $T_C$ of TbFeCo is about 270° C., which are all higher than $T_W$≈200° C., the magnetic state in one crystal grain composed of "a crystal grain 3020 of lower AF layer/a crystal grain 4010 of intermediate AF layer/a crystal grain 5020 of upper F layer" at T=$T_W$ is "AF/AF/F." However, since $T_B$ of γ-FeMn is about 155° C., more accurate magnetic state thereof is "AF/Para.(interface)/AF/Para.(interface)/F." Therefore, at T=$T_W$, the magnetization vector in one crystal grain 5020 of the upper F layer is easily turned to downward due to the low $H_C$ of TbFeCo. However, because the exchange coupling is not yet formed, the direction of the AF spin arrangement in one crystal grain 4010 of the intermediate AF layer is arbitrary. Similarly, the direction of the AF spin arrangement in one crystal grain 3020 of the lower AF layer is arbitrary.

As shown in FIG. 12(b), when $T=T_B$, the exchange coupling occurs. Accordingly, the magnetic state of one crystal grain formed of "one crystal grain 3020 of lower AF layer/one crystal grain 4010 of intermediate AF layer/one crystal grain 5020 of upper F layer" shifts from "AF/Para.(interface)/AF/Para.(interface)/F" to "AF/AF/F." To make the spin (total spins) in one crystal grain 5020 of the upper F layer face downward, the spin of each layer, each interface is arranged and field-cooled in frozen state. The internal field generated by the exchange coupling is about several hundred kOe. Due to this magnitude, the AF spin in one crystal grain 4010 of the intermediate AF layer and the AF spin in one crystal grain 3020 of the lower AF layer are ordered as shown in FIG. 12(b).

Because of the property "$T_B \ll T_N$", at $T=T_B$, one crystal grain 4010 of the intermediate AF layer has a relatively large $<S_{AF}>$, and therefore there is the AF spin arrangement with a relatively large $J_{AF}<S_{AF}><S_{AF}>$. At $T=T_B$, "AF/AF/F" exchange coupling abruptly occurs with large $<S_{AF}>$ and $J_{AF}<S_{AF}><S_{AF}>$, so $H_C$ at $T=T_B$ rapidly increases. This is the reason why a drastic temperature variation in $H_C$ is obtained at $T=T_B$, and is a physical phenomenon obtained based on the specific property of "$T_B \ll T_N$."

As shown in FIG. 12(c), when $RT<T<T_B$, the magnetization vector of each layer is increased, and keeps increasing when $T=RT$ and stops as shown in FIG. 12(d). In one crystal grain 5020 of the upper F layer, an increase of spin size due to the temperature decline of RE.spin is greater than an increase of spin size due to the temperature decline of TM.spin. Thus, RE.spin and TM.spin are increased. When $T=RT$, the difference between the RE.spin size and the TM.spin size becomes small down to $M_s \approx 50$ emu/cm$^3$. If the reproduction sensitivity lacks due to the low $M_S$, a reproduction exclusive layer such as amorphous DyTbFeCo film having $M_S$ value of about 300 emu/cm$^3$ at RT may be formed on the upper F layer 502. So far, the thermally assisted magnetic recording procedure has been explained. The upward recording procedure is only the opposite of the magnetization vector.

Also, the lower AF layer 302 of the present invention may be formed of L1$_0$-(PtPd)Mn film, L1$_0$-NiMn film or ordered phase Mn$_3$Ir film. As summarized in FIG. 17, (a) $(KV)_{eff}/k_BT$ value of the upper F layer 502 at RT is about 198 and $H_C$ value thereof is about 137 kOe even in the combination where the lower AF layer 302 is formed of L1$_0$-(PtPd)Mn film and the upper F layer 502 is formed of TbFeCo film;

(b) $(KV)_{eff}/k_BT$ value of the upper F layer 502 at RT is about 27 and $H_C$ value thereof is about 17 kOe even in the combination where the lower AF layer 302 is formed of L1$_0$-NiMn film and the upper F layer 502 is formed of TbFeCo film; and (c) $(KV)_{eff}/k_BT$ value of the upper F layer 502 at RT is about 46 and $H_C$ value thereof is about 31 kOe even in the combination where the lower AF layer 302 is formed of ordered phase Mn$_3$Ir film and the upper F layer 502 is formed of TbFeCo film. Although the heating process is required for obtaining the L1$_0$-(PtPd)Mn film, L1$_0$-NiMn film, or ordered phase Mn$_3$Ir, since the process may be conducted at 250° C. at most, there is no problem to put it into practical use.

As summarized in FIG. 15, the intermediate AF layer 401 according to this embodiment of the invention may be formed of one of γ-MnIr film, γ-MnRh film, γ-MnNi film, γ-MnRu film, γ-MnPt film, γ-MnPd film, γ-Mn(PtRh) film, and γ-Mn(RuRh) film. Also, to make $T_B$ below 200° C., the Ir composition, Rh composition, Ru composition, Ni composition, Pt composition, Pd composition, (PtRh) composition, and (RuRh) composition are less than 20 at.%, respectively. As shown in FIG. 15, $K_{AF}$ value of the AF layer is the same as that of γ-FeMn film, and $T_B$ value of the AF layer is the same as that of γ-FeMn film, and the AF layer has the property of "$T_B \ll T_N$".

Also, as can be seen in FIG. 15, in case of γ-MnIr film, γ-MnRh film, and γ-MnRu film, the difference between $T_B$ and $T_N$ is great. Therefore, by using the AF layer thereof, the property of "$T_B \ll T_N$" becomes more effective. Namely, during the thermally assisted magnetic recording procedure, at $T=T_B$, the "AF/AF/F" exchange coupling abruptly occurs with larger $<SAF>$ and $JAF<SAF><SAF>$, so it becomes possible to increase the temperature gradient of $H_C$ at $T=T_B$.

Moreover, the length of one side of the closely packed hexagonal lattice in the surface (111) of the γ-MnIr film, γ-MnRh film, and γ-MnRu film is almost equal to the length of one side of the closely packed hexagonal lattice in the surface (111) of the L1$_0$-PtMn film, L1$_0$-(PtPd)Mn film, L1$_0$-NiMn film, and ordered phase Mn$_3$Ir film composing the lower AF layer 302. Hence, by forming the intermediate AF layer 401 with the γ-MnIr film, γ-MnRh film, and γ-MnRu film, lattice mismatch problem can be avoided. In consequence, it becomes possible to obtain $H_C$ value or $(KV)_{eff}/k_BT$ value close to the theoretical values (i.e., calculation results shown in FIG. 17), and the anisotropy dispersion of the upper F layer 502 can be kept small.

Furthermore, in the case of raising $T_W$ higher than 200° C., it is desirable to use the γ-MnIr film, γ-MnRh film, and γ-MnRu film having more than 20 at.% of Ir composition, Rh composition and Ru composition, respectively, as the intermediate AF layer 401. The resulting AF layer thereof has about 240–300° C. $T_B$ value, and it becomes possible to adjust the $T_B$ value to a desired value, i.e., right below the $T_W$, by the Ir composition, Rh composition, and Ru composition.

However, the γ-MnIr film, γ-MnRh film, and γ-MnRu film increase the cost. Thus, when using the AF layer made of such films, trade-off is necessary between the magnetic physical property value and the cost problem.

So far, the magnetic recording with perpendicular anisotropy in the exchange coupled tri-layered magnetic medium has been explained. However, the development is also possible for magnetic recording with in-plane anisotropy and magnetic recording with inclined anisotropy.

FIG. 13 summarizes a reversed temperature relationship between $T_W$ and $T_C$ of the upper F layers 501 and 502, between $T_B$ and $T_W$ of the intermediate AF layer 401, between $T_W$ and $T_C$ of the lower F layer 301, and between $T_W$ and $T_N$ of the lower AF layer 302, respectively. As described in FIG. 13, if only one of the temperature relationships is reversed, the thermally assisted magnetic recording medium explained in Examples 1 through 4 for obtaining a drastic temperature variation in $H_C$ cannot be realized.

In addition, since the exchange coupling theory has not been established, a weighted average was used for approximate calculation of $H_C$ value of FIG. 17. Needless to say, the $H_C$ value is obtained based on the ideal "F/AF/F" exchange coupling or "AF/AF/F" exchange coupling. In detail, $H_C$ value is obtained using a weighted average based on the assumption that the product of $K_F V_F$ of the lower F layer 301 or the product of $K_{AF}V_{AF}$ of the lower AF layer 302 is completely overlapped with the product of $K_F V_F$ of the upper F layer 501 or 502 through the intermediate AF layer 401. Therefore, because of the lattice mismatching problem or the containing of impurities on the interface, the actual $H_C$ value is lower than the $H_C$ value shown in FIG. 17. However, through other experiments of another field, the inventors discovered that the $H_C$ value of a hard magnetic F layer can be increased up to several times~several tens of times compared to that of a single layer, by exchange coupling between the hard magnetic F layer and the AF layer. In addition, although lattice mismatching is great even in the magnetic layer structure formed of "FeRh (lower layer)/FePt (upper layer)" disclosed in Appl. Phys. Lett., Vol. 82, pp. 2859-2861(2003), the $H_C$ value of the single upper F layer can be increased from about 1 kOe to about 8 kOe by "AF/F" exchange coupling. Thus, from the perspective of the experiment, the $H_C$ value of the upper F layers 501 and 502 can be increased several times~several tens of times compared to that of the single layer, and it is easy to expect that at least $H_C$>10 kOe (maximum field of the recording head) can be obtained in most of the combinations without the mark "x" in FIG. 17.

Moreover, when an F layer as the lower F layer 301 does not have a high $K_F$ and an AF layer as the lower AF layer 302 does not have a high $K_{AF}$, a high $(KV)_{eff}/k_BT$ value and a high $H_C$ value cannot be given to the upper F layers 501 and 502 for recording and reproducing. No effect can be obtained for the F layer having a low $K_F$ or the AF layer having a low $K_{AF}$. The combination of the lower AF layer 302 and the upper F layer 501 with the mark "x" in FIG. 17 is the typical example thereof because of the low $K_{AF}$.

In addition, the thermally assisted magnetic recording medium described in Examples 1 through 4 cannot be realized in the double layer "AF/F" exchange coupling between the lower AF layer 302 without the intermediate AF layer 401 and the upper F layer 501 or 502 for recording and reproducing. This is because the AF layer having a $T_B$ value of about 150-200° C. and a high $K_{AF}$ is almost useless. That is, $T_N$ of the AF layer having a high $K_{AF}$ is always high (FIG. 16), and therefore $T_B$ value is much higher than $T_W \approx 200°$ C. However, if $T_B$ value is about 150-200° C. and there is an AF layer having a high $K_{AF}$, it is theoretically possible.

Moreover, a bias magnetic field is generated by the magnetization of $L1_0$-FePt, $L1_0$-CoPt or $L1_0$-FePtNi forming the lower F layer 301, and this bias magnetic field may be impressed to the upper F layers 501 and 502 for recording and reproducing, thereby resulting in adverse effect upon the recording operation. However, this problem can be solved by increasing the thickness of the intermediate AF layer 401. Also, a multilayer (Fe/Cr) can be disposed beneath the under layer 200, and a mechanism for absorbing the leaked magnetic flux from the bias magnetic field may be installed. In the case where the under layer is formed of an AF layer, the bias magnetic field is 0. Thus, the above-described problem does not occur.

Example 5

Figure 18:
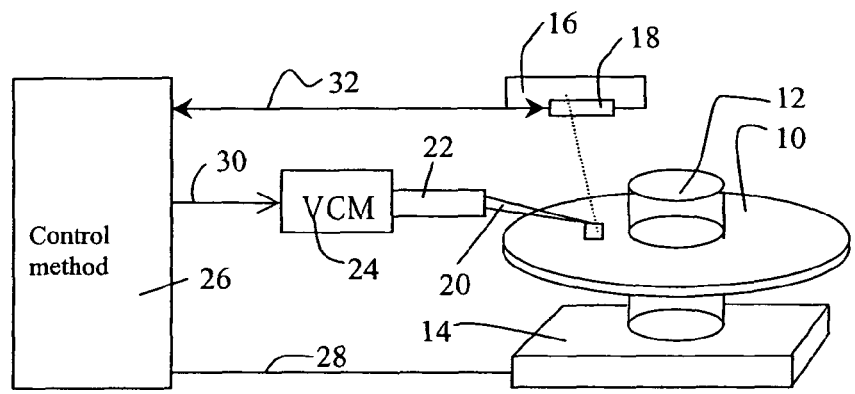
FIG. 18 illustrates a magnetic disk apparatus using the thermally assisted magnetic recording medium according to the present invention.

FIG. 18 illustrates one example of magnetic disk apparatus using the thermally assisted magnetic recording medium according to the present invention. The thermally assisted magnetic recording medium of the present invention is applied to the magnetic disk apparatus, which is a magnetic recording apparatus. However, the thermally assisted magnetic recording medium of the present invention can also be applied to magnetic recording apparatuses, such as a magnetic tape device, and optical magnetic disk apparatuses.

Particularly, the magnetic disk apparatus illustrated in the drawing is used for recording data in a recording area called a track in concentric circle shape, and includes a magnetic disk 10 as a disk-shaped thermally assisted magnetic recording medium according to the present invention, an optical near-field ray and laser ray illuminating mechanism for warming the thermally assisted magnetic recording medium that reads or writes the data, a magnetic head 18, an actuator mechanism for supporting and moving the magnetic head 18 to a predetermined position on the magnetic disk 10, and a control unit 26 for controlling data transmission/receiving being read or written by the magnetic head 18 and the movement of the actuator mechanism.

The following will now explain the configuration and operation of these components. At least one rotatable magnetic disk 10 is supported by a rotation axis 12, and rotates by a drive motor 14. At least one slider 16 is installed on the magnetic disk 10, where the slider 16 supports at least one magnetic head 18 for reading and writing data.

When the magnetic disk 10 rotates, the slider 16 simultaneously moves on the surface of the disk and accesses to a predetermined position where desired data are recorded. The slider 16 is mounted at an arm 22 by a gimbal 20. The gimbal 20 has a little of elasticity to be able to adhere the slider 16 closely onto the magnetic disk 10. The arm 22 is mounted at the actuator 24. FIG. 18 also illustrates an enlarged view of the slider 16 supported by the gimbal.

A voice coil motor may be used as the actuator 24. The voice coil motor includes coils movably installed in the fixed magnetic field, and the moving direction and speed of the coils are controlled by an electric signal provided from the control unit 26 through a line 30. Therefore, the actuator mechanism of this embodiment includes the slider 16, gimbal 20, arm 22, actuator 24 and line 30.

During the operation of the magnetic disk, an air bearing is generated by air flow between the slider 16 and the disk surface due to the rotation of the magnetic disk 10, and this raises the slider 16 from the surface of the magnetic disk 10. Therefore, the air bearing makes the slider 16 rise from the magnetic disk 10 while maintaining a fixed distance from the magnetic disk 10 without contacting the surface of the magnetic disk, in balance with the elasticity of the gimbal 20.

In general, the control unit 26 includes a logic circuit, a memory and a microprocessor. The control unit 26 transmits and receives a control signal through each line, and controls the components of the magnetic disk apparatus. For instance, the motor 14 is controlled by a motor drive signal transferred through the line 28. The actuator 24 is controlled by a head position control signal and a seek control signal transferred through the line 30 to move or locate the selected slider 16 to a desired data track on the related magnetic disk 10.

The control unit 26 receives through the line 32 an electrical signal the magnetic head 18 read from the data of the magnetic disk 10 and converted, and decrypts the signal. Moreover, the control unit 26 transmits the electrical signal (including an optical near-field light and laser light illuminating signals) for writing data onto the magnetic disk 10 to the magnetic head 18 through the line 32. That is, the control unit 26 controls transmission/receiving of data the magnetic head 18 reads or writes.

Also, the read and write signals can be transferred directly from the magnetic head 18. Other examples of the control signal include an access control signal, a clock signal, etc. Moreover, the magnetic disk apparatus includes a plurality of magnetic disks or an actuator, and the actuator may include a plurality of magnetic heads.

Figure 19:
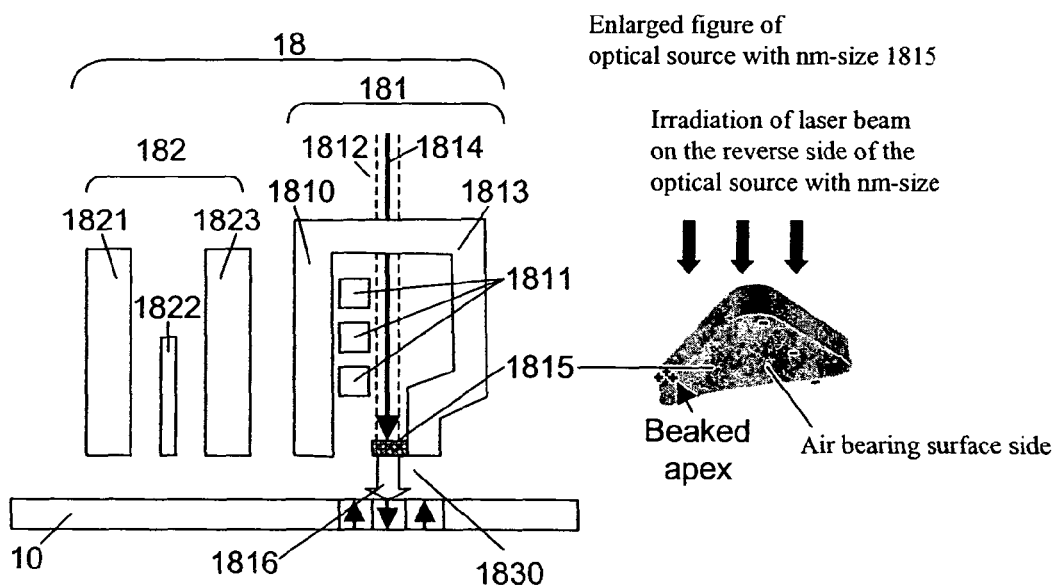
FIG. 19 illustrates an example of a magnetic head.

The following now explains one example of the magnetic head 18 with reference to FIG. 19. The magnetic head 18 includes a thermally assisted magnetic recording head 181 and a reproducing head 182.

The thermally assisted magnetic recording head 181 includes a lower magnetic core 1810, a coil 1811, a wave guide 1812 installed between the coil 1811 and an upper magnetic core 1813 for transmitting a laser light 1814, and the upper magnetic core 1813. On the side of an air bearing surface 1830 of the magnetic recording head 181, a nanoscale light source 1815 composed of Au thin band is installed, and the laser light 1814 is irradiated onto the back body (the reverse side) of the nanoscale light source 1815. The nanoscale light source 1815 is formed of a thin band and heated to a high temperature by the laser light 1814, whereby inelastic scattering of electrons in the light source becomes active and plasmon is excited. The front end portion of the nanoscale light source 1815 has a Beaked Apex shape with a width of several tens of nm, so that thermal (plasmon) energy is intensively localized on the front end portion and optical near-field light 1816 (optical spot size is equal to or below several 10 nm) is generated therefrom. The optical near-field light 1816 locally heats the thermally assisted magnetic recording medium 10 to a desired temperature, and at the same time applies a recording magnetic field from the thermally assisted magnetic recording head 181 to the thermally assisted magnetic recording medium 10 to execute the thermally assisted magnetic recording operation. At least one of the reproducing head 182 includes a lower shield 1821, a high sensitivity reproducing sensor 1822 such as a GMR head or TMR head, and an upper shield 1823.

So far, the thermally assisted magnetic recording medium and the magnetic disk apparatus have been explained. In particular, the under layer 200 of the thermally assisted magnetic recording medium may be formed of a Cu film, Cr film, CrRu film, NiFeCr film, Rh film, Pd film, Ag film, Pt film, MgO film or Au film, where one of $L1_0$-FePt film, $L1_0$-CoPt film, $L1_0$-FePtNi film, $L1_0$-PtMn film, $L1_0$-(PtPd)Mn film, $L1_0$-NiMn film, or ordered phase $Mn_3Ir$ film can be used as the lower F layer 301 or the lower AF layer 302.

As for the lower F layer 301, $L1_0$-FePtCo film obtained by adding Co to $L1_0$-FePt film, or $L1_0$-CoPtNi film obtained by adding Ni to $L1_0$-CoPt film may be used. Also, a film having a high $K_F$, such as, a $L1_0$-FePd film, ordered phase $Co_3Pt$ film, disordered phase CoPt film, SmCo film, or NdFeB film may be used. As for the lower AF layer 302, an ordered phase AuMn film or disordered phase CrMnM film may be used. As for third element (M), Pt, Rh, Pd, Cu or a mixture thereof may be used.

As for the intermediate AF layer 401, an AF layer having a high $K_{AF}$ may be used. However, there are few AF films that have a high $K_{AF}$ and satisfy the condition of $T_B<T_W(T_W\approx200°$ C.). In effect, the same effect can be obtained by forming the intermediate AF layer 401 with spin glass or a magnetic film having mictomagnetism. In addition, when a technique for lowering the ordering temperature of FeRh group materials as the intermediate AF layer 401 below 350° C. is developed, the FeRh group materials with the phase transition from AF→F around 100° C. may be used.

The upper F layer 501 may contain a CoCr alloy, CoPt alloy, CoCrTa alloy or CoCrPtTa alloy. Also, it can be formed of a (Co/Pt) multilayer or (Co/Pd) multilayer. Also, to make the $H_C$ value at RT satisfy $H_C\ll10$ kOe, the upper F layer 501 may contain an $L1_0$-FePtM alloy, $L1_0$-CoPtM alloy, $L1_0$-FePtNiM alloy, $L1_0$-FePtCoM alloy, or $L1_0$-CoPtNiM alloy (M: third element). Here, the third element M is selected from a group consisting of Cu, Ru, Rh, Pd, Ag, Au, Sn, Sb, Ir, Pb, B, and a mixture thereof. Among them, the Grain segregation effect can be obtained by Ag, Sn, Sb, Ir, Pb and B additives because these elements are soluble by force in the disordered phase, but become free to be insoluble in the ordered phase) by the disorder/order transition.

In addition, the upper F layer 502 may be formed of an RE.-TM. alloy film, such as, an amorphous TbFe film, amorphous GdFe film, amorphous ThCo film, amorphous GdTb-FeCo film, amorphous GdDyFeCo film, amorphous NdFeCo film, or amorphous NdTbFeCo film.

The protected layer 600 may contain Cu, Cr, Ta, Ru, Pd, Ag, Pt or Au. Any film that can secure corrosion-resistance of the films below including the upper F layers 501 and 502 can be used.

Moreover, an F layer such as a Co film can be inserted additionally between the lower AF layer 302 and the intermediate AF layer 401. Also, a (Co/Pt) multilayer or (Co/Pd) multilayer can be interposed therebetween. A heat sink corresponding layer made of Au or Cu having high thermal conductivity or SUL (Soft underlayer) may be formed below the under layer 200.

The basic concept of the invention that the temperature gradient of $H_C$ is prepared at a proper temperature using $T_B$ of the intermediate AF layer 401 can be developed in the MRAM (Magentic random access memory).

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A thermally assisted magnetic recording medium, comprising a layered film structure formed of an under layer made of a high $K_F$ ferromagnetic substance satisfying $T_W<T_C$, an intermediate layer with $K_{AF}$ satisfying $T_B<T_W$, and an upper layer used as a recording and reproducing layer made of a ferromagnetic substance or ferrimagnetic substance satisfying $T_W<T_C$, where $T_W$ is a recording temperature, $T_C$ is a Curie point, $T_B$ is a blocking temperature, $K_F$ is a ferromagnetic magnetocrystalline anisotropy constant, and $K_{AF}$ is an antiferromagnetic magnetocrystalline anisotropy constant, wherein $K_F$ of the under layer is larger than $K_{AF}$ of the intermediate antiferromagnetic layer, wherein the intermediate layer is selected from a group consisting of γ-MnIr, γ-MnRh, γ-MnRu, γ-MnNi, γ-MnPt, γ-MnPd, γ-Mn(PtRh) or γ-Mn(RuRh), wherein the under layer and the upper layer have different compositions.

2. The medium of claim 1, wherein the under layer made of a ferromagnetic substance is formed of a $L1_0$-FePt group film, the intermediate layer made of an antiferromagnetic substance is formed of a γ-FeMn group film, and the upper layer containing ferrimagnetic substance is formed of an amorphous TeFeCo group film.

3. The medium of claim 1, wherein the under layer containing a ferromagnetic substance is made of $L1_0$-CoPt or $L1_0$-FePtNi.

4. A magnetic recording medium apparatus comprising:
a thermally assisted magnetic recording medium;
a medium driving unit for driving the thermally assisted magnetic recording medium;
a magnetic head mounted with a recording head having a medium heating element and a recording magnetic field applying element and a reproducing head; and
a magnetic head driving unit that positions the magnetic head to a desired position on the thermally assisted magnetic recording medium,
wherein, the thermally assisted magnetic recording medium has a layered film structure formed of an under layer made of a high $K_F$ ferromagnetic substance satisfying $T_W<T_C$, an intermediate antiferromagnetic layer with $K_{AF}$ satisfying $T_B<T_W$, and an upper layer used as a recording and reproducing layer made of a ferromagnetic substance or ferrimagnetic substance satisfying $T_W<T_C$, where $T_W$ is a recording temperature, $T_C$ is a Curie point, $T_B$ is a blocking temperature, $K_F$ is a ferromagnetic magnetocrystalline anisotropy constant, and $K_{AF}$ is an antiferromagnetic magnetocrystalline anisotropy constant, wherein $K_F$ of the under layer is larger than $K_{AF}$ of the intermediate antiferromagnetic layer, wherein the under layer and the upper layer have different compositions.

5. The magnetic recording medium apparatus of claim 4, wherein the under layer made of a ferromagnetic substance is formed of a $L1_0$-FePt group film, the intermediate layer made of an antiferromagnetic substance is a γ-FeMn group film, and the upper layer made of a ferromagnetic substance is a CoCrPt—SiO$_2$ group film or CoCrPt—Cr group film.

6. The magnetic recording medium apparatus of claim 4, wherein the under layer made of a ferromagnetic substance is formed of a $L_{10}$-FePt group film, the intermediate layer made of an antiferromagnetic substance is formed of a γ-FeMn group film, and the upper layer containing a ferrimagnetic substance is formed of an amorphous TeFeCo group film.

7. The magnetic recording medium apparatus of claim 4, wherein intermediate layer made of an antiferromagnetic substance is formed of a γ-FeMn group film, and the upper layer made of a ferromagnetic substance is formed of a CoCrPt—SiO$_2$ group film or CoCrPt—Cr group film.

8. The magnetic recording medium apparatus of claim 4, wherein the under layer containing a ferromagnetic substance is made of $L1_0$-CoPt or $L1_0$-FePtNi.

9. The magnetic recording medium apparatus of claim 4, wherein the intermediate layer made of an antiferromagnetic substance contains γ-MnIr, γ-MnRh, γ-MnRu, γ-MnNi, γ-MnPt, γ-MnPd, γ-Mn(PtRh) or γ-Mn(RuRh).

* * * * *